US012696234B2

(12) United States Patent
Zorgui et al.

(10) Patent No.: US 12,696,234 B2
(45) Date of Patent: Jul. 28, 2026

(54) SENSING ASSISTED POSITIONING

(71) Applicant: QUALCOMM Incorporated, San Diego, CA (US)

(72) Inventors: Marwen Zorgui, San Diego, CA (US); Srinivas Yerramalli, San Diego, CA (US); Mohammed Ali Mohammed Hirzallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 18/336,664

(22) Filed: Jun. 16, 2023

(65) Prior Publication Data

US 2024/0422729 A1 Dec. 19, 2024

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC .. H04W 64/006; H04L 5/0051; G01S 13/003; G01S 13/26; G01S 13/42; G01S 13/581; G01S 7/006
See application file for complete search history.

(56) References Cited

U.S. PATENT DOCUMENTS

2023/0324541 A1* 10/2023 Zorgui .................... G01S 7/006
455/456.1
2025/0016719 A1* 1/2025 Duan .................... G01S 13/765

FOREIGN PATENT DOCUMENTS

| CN | 106357707 A | * | 1/2017 | ............. H04L 67/12 |
| CN | 112863219 A | * | 5/2021 | ........... G08G 1/0969 |
| WO | WO-2022081624 A1 | | 4/2022 | |

(Continued)

OTHER PUBLICATIONS

Partial International Search Report—PCT/US2024/026067—ISA/EPO—Jul. 17, 2024.

(Continued)

*Primary Examiner* — Siu M Lee
(74) *Attorney, Agent, or Firm* — QUALCOMM Incorporated

(57) ABSTRACT

This disclosure provides systems, methods, and devices for wireless communication that support sensing assisted positioning. In a first aspect, a method of wireless communication includes receiving, from a first management function of a network, a first configuration that indicates a first parameter associated with a sensing operation operable to measure a characteristic of an object within an environment. The method also includes receiving, from a second management function of the network, a second configuration that indicates a second parameter associated with a positioning operation operable to identify a position of the object within the environment based on the characteristic The method further includes transmitting a sensing report based on the sensing operation and that indicates the characteristic, and transmitting a positioning report. Each of the positioning report and the sensing report indicating the position of the object within the environment. Other aspects and features are also claimed and described.

22 Claims, 13 Drawing Sheets

(56) References Cited

FOREIGN PATENT DOCUMENTS

WO WO-2022133951 A1 6/2022

OTHER PUBLICATIONS

3GPP: "3rd Generation Partnership Project, Technical Specification Group Radio Access Network, NG-RAN, NR Positioning Protocol A (NRPPa) (Release 17)", 3GPP TS 38.455 V17.4.0, 38455-H40, 3rd Generation Partnership Project, Mobile Competence Centre, 650, Route Des Lucioles, F-06921, Sophia-Antipolis Cedex, France, Apr. 3, 2023, XP052366573, pp. 1-202, chapter 8.5.1.2, chapter 9.1.4.1.
International Search Report and Written Opinion—PCT/US2024/026067—ISA/EPO—Nov. 13, 2024.

* cited by examiner

Transmit, to a second management function of a network, a request associated with a sensing operation, the second management function configured to initiate the sensing operation  1002

Receive, from the second management function, a response based on the request  1004

Identify a position of an object in an environment based on the response  1006

1000

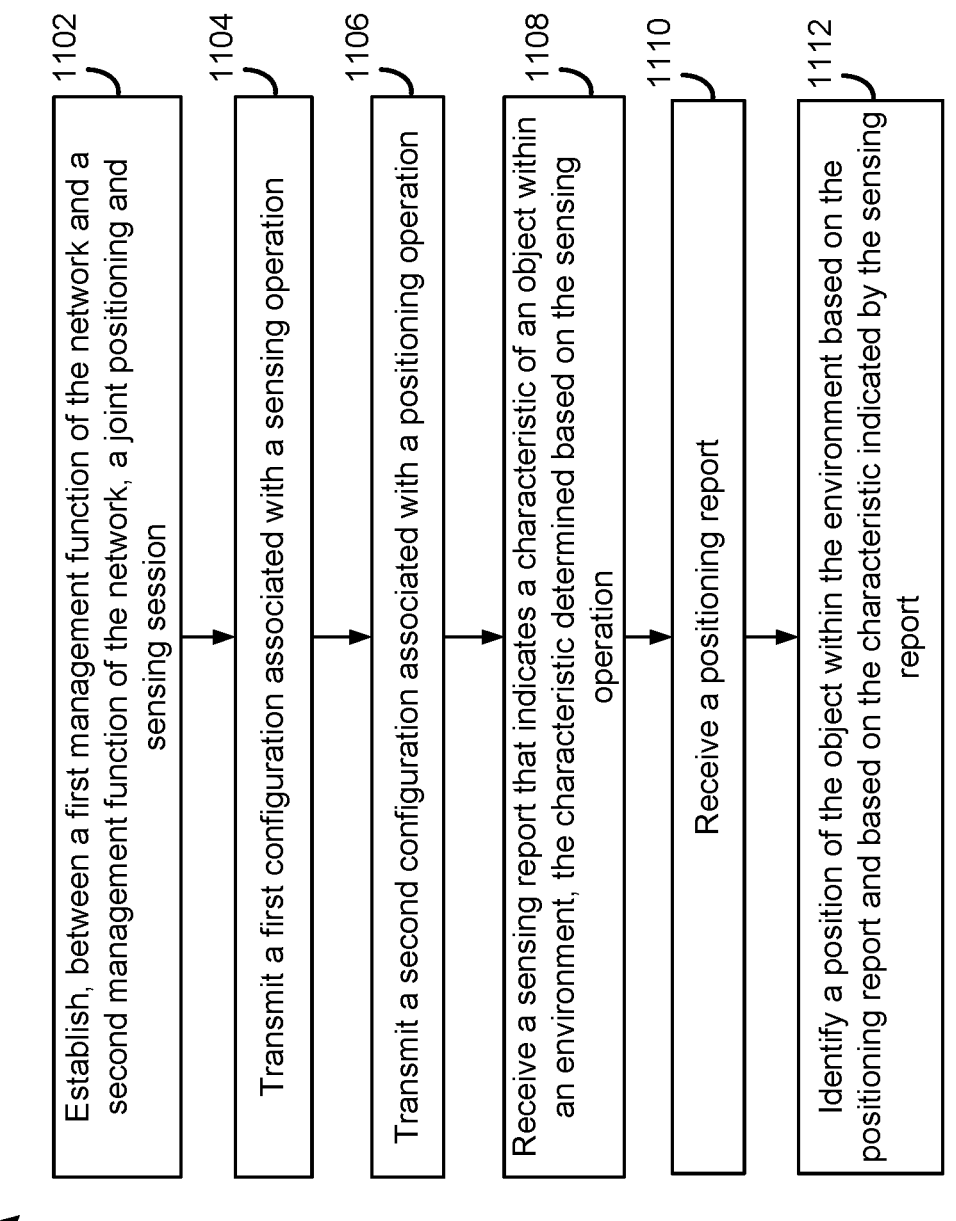

1102 — Establish, between a first management function of the network and a second management function of the network, a joint positioning and sensing session 1104 — Transmit a first configuration associated with a sensing operation 1106 — Transmit a second configuration associated with a positioning operation 1108 — Receive a sensing report that indicates a characteristic of an object within an environment, the characteristic determined based on the sensing operation 1110 — Receive a positioning report 1112 — Identify a position of the object within the environment based on the positioning report and based on the characteristic indicated by the sensing report

SENSING ASSISTED POSITIONING

TECHNICAL FIELD

Aspects of the present disclosure relate generally to positioning systems, and more particularly, to sensing assisted positioning. Some features may enable and provide enhanced positioning determinations of objects in an environment, thereby resulting in an enhanced accuracy, an enhanced precision, or both of the positioning determinations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Accurately and precisely identifying a position of an object in an environment is challenging. Factors that impact the accuracy and precision with which the position of an object is determined may include a number of network devices deployed to identify the position of the object, a bandwidth over which these network devices operate, channel conditions affecting channels over which these network devices operate, or any combination thereof. Examples of channel conditions that may affect the accuracy, the precision, or both of a positioning operation may include line of sight (LOS) and non-line of sight (NLOS) conditions, noise, or a combination thereof. Enhancing the accuracy, the precision, or both of a positioning operation configured to identify a position of one or more objects in an environment would be advantageous.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method to support one or more positioning operations performed by a first management function of a network includes transmitting, to a second management function of the network, a request associated with a sensing operation. The second management function is configured to initiate the sensing operation. The method also includes receiving, from the second management function, a response based on the request. The method further includes identifying a position of an object in an environment based on the response.

In an additional aspect of the disclosure, a management function of a network includes a memory storing processor-readable code, and at least one processor coupled to the memory. The at least one processor is configured to execute the processor-readable code to cause the at least one processor to transmit, to a second management function of the network, a request associated with a sensing operation. The second management function is configured to initiate the sensing operation. The at least one processor is further configured to execute the processor-readable code to cause the at least one processor to receive, from the second management function, a response based on the request. The at least one processor is also configured to execute the processor-readable code to cause the at least one processor to identify a position of an object in an environment based on the response.

In an additional aspect of the disclosure, an apparatus includes means for transmitting, to a second management function of the network, a request associated with a sensing operation. The second management function is configured to initiate the sensing operation. The apparatus further includes means for receiving, from the second management function, a response based on the request. The apparatus also includes means for identifying a position of an object in an environment based on the response.

In an additional aspect of the disclosure, a non-transitory computer-readable medium stores instructions that, when executed by a processor, cause the processor to perform operations. The operations include transmitting, to a second management function of the network, a request associated with a sensing operation. The second management function is configured to initiate the sensing operation. The operations further include receiving, from the second management function, a response based on the request. The operations also include identifying a position of an object in an environment based on the response.

In an additional aspect of the disclosure, an apparatus includes a communication interface configured to transmit, to a second management function of the network, a request associated with a sensing operation. The second management function is configured to initiate the sensing operation. The communication interface is further configured to receive, from the second management function, a response based on the request. The apparatus further includes at least one processor coupled to a memory storing processor-readable code. The at least one processor is configured to execute the processor-readable code to cause the at least one processor to identify a position of an object in an environment based on the response.

In one aspect of the disclosure, a method to support one or more positioning operations performed by a network entity includes receiving, from a first management function of a network, a first configuration that indicates a first parameter associated with a sensing operation. The sensing operation is operable to measure a characteristic of an object within an environment. The method further includes receiving, from a second management function of the network, a second configuration that indicates a second parameter associated with a positioning operation. The positioning operation is associated with a determination of a position of the object within the environment. The method also includes transmitting a positioning report based on the positioning operation and that is associated with the position of the object within the environment. The method includes transmitting a sensing report based on the sensing operation and that indicates a measurement of the characteristic to enable an update of the position of the object determined based on the positioning report.

In an additional aspect of the disclosure, a network entity includes a memory storing processor-readable code, and at least one processor coupled to the memory. The at least one processor is configured to execute the processor-readable code to cause the at least one processor to receive, from a first management function of a network, a first configuration that indicates a first parameter associated with a sensing operation. The sensing operation is operable to measure a characteristic of an object within an environment. The at least one processor is further configured to execute the processor-readable code to cause the at least one processor to receive, from a second management function of the network, a second configuration that indicates a second parameter associated with a positioning operation. The positioning operation is associated with a determination of a position of the object within the environment. The at least one processor is also configured to execute the processor-readable code to cause the at least one processor to transmit a positioning report based on the positioning operation and that is associated with the position of the object within the environment. The at least one processor is configured to execute the processor-readable code to cause the at least one processor to transmit a sensing report based on the sensing operation and that indicates a measurement of the characteristic to enable an update of the position of the object determined based on the positioning report.

In an additional aspect of the disclosure, an apparatus includes means for receiving, from a first management function of a network, a first configuration that indicates a first parameter associated with a sensing operation. The sensing operation is operable to measure a characteristic of an object within an environment. The apparatus further includes means for receiving, from a second management function of the network, a second configuration that indicates a second parameter associated with a positioning operation. The positioning operation is associated with a determination of a position of the object within the environment. The apparatus also includes means for transmitting a positioning report based on the positioning operation and that is associated with the position of the object within the environment. The apparatus includes means for transmitting a sensing report based on the sensing operation and that indicates a measurement of the characteristic to enable an update of the position of the object determined based on the positioning report.

In an additional aspect of the disclosure, a non-transitory computer-readable medium stores instructions that, when executed by a processor, cause the processor to perform operations. The operations include receiving, from a first management function of a network, a first configuration that indicates a first parameter associated with a sensing operation. The sensing operation is operable to measure a characteristic of an object within an environment. The operations further include receiving, from a second management function of the network, a second configuration that indicates a second parameter associated with a positioning operation. The positioning operation is associated with a determination of a position of the object within the environment. The operations also include transmitting a positioning report based on the positioning operation and that is associated with the position of the object within the environment. The operations include transmitting a sensing report based on the sensing operation and that indicates a measurement of the characteristic to enable an update of the position of the object determined based on the positioning report.

In an additional aspect of the disclosure, an apparatus includes a communication interface configured to receive, from a first management function of a network, a first configuration that indicates a first parameter associated with a sensing operation. The sensing operation is operable to measure a characteristic of an object within an environment. The communication interface is also configured to receive, from a second management function of the network, a second configuration that indicates a second parameter associated with a positioning operation. The positioning operation is associated with a determination of a position of the object within the environment. The apparatus further includes at least one processor coupled to a memory storing processor-readable code. The at least one processor is configured to execute the processor-readable code to cause the at least one processor to generate a positioning report based on the positioning operation and that is associated with the position of the object within the environment, and generate a sensing report based on the sensing operation and that indicates a measurement of the characteristic to enable an update of the position of the object determined based on the positioning report.

In one aspect of the disclosure, a method to support a positioning operation and a sensing operation performed by a network includes establishing, between a first management function of the network and a second management function of the network, a joint positioning and sensing session. The method further includes transmitting a first configuration associated with a sensing operation, and transmitting a second configuration associated with a positioning operation. The method also includes receiving a positioning report, and receiving a sensing report that indicates a characteristic of an object within an environment. The characteristic is determined based on the sensing operation. The method also includes identifying a position of the object within the environment based on the positioning report and based on the characteristic indicated by the sensing report.

In an additional aspect of the disclosure, a network includes a memory storing processor-readable code, and at least one processor coupled to the memory. The at least one processor is configured to execute the processor-readable code to cause the at least one processor to establish, between a first management function of the network and a second management function of the network, a joint positioning and sensing session. The at least one processor is further configured to execute the processor-readable code to cause the at least one processor to transmit a first configuration associated with a sensing operation, and transmit a second configuration associated with a positioning operation. The at least one processor is further configured to execute the processor-readable code to cause the at least one processor to receive a positioning report, and receive a sensing report that indicates a characteristic of an object within an environment. The characteristic is determined based on the sensing operation. The at least one processor is further configured to execute the processor-readable code to cause the at least one processor to identify a position of the object within the environment based on the positioning report and based on the characteristic indicated by the sensing report.

In an additional aspect of the disclosure, an apparatus includes means for establishing, between a first management function of the network and a second management function of the network, a joint positioning and sensing session. The apparatus further includes means for transmitting a first configuration associated with a sensing operation, and means for transmitting a second configuration associated with a positioning operation. The apparatus also includes means for receiving a positioning report, and means for receiving a sensing report that indicates a characteristic of an object within an environment. The characteristic is determined based on the sensing operation. The apparatus includes means for identifying a position of the object within the environment based on the positioning report and based on the characteristic indicated by the sensing report.

In an additional aspect of the disclosure, a non-transitory computer-readable medium stores instructions that, when executed by a processor, cause the processor to perform operations. The operations include establishing, between a first management function of the network and a second management function of the network, a joint positioning and sensing session. The operations further include transmitting a first configuration associated with a sensing operation, and transmitting a second configuration associated with a positioning operation. The operations also include receiving a positioning report, and receiving a sensing report that indicates a characteristic of an object within an environment. The characteristic is determined based on the sensing operation. The operations include identifying a position of the object within the environment based on the positioning report and based on the characteristic indicated by the sensing report.

In an additional aspect of the disclosure, an apparatus includes at least one processor coupled to a memory storing processor-readable code. The at least one processor is configured to execute the processor-readable code to cause the at least one processor to establish, between a first management function of the network and a second management function of the network, a joint positioning and sensing session. The apparatus further includes a communication interface configured to transmit a first configuration associated with a sensing operation, and transmit a second configuration associated with a positioning operation. The communication interface is also configured to receive a positioning report, and receive a sensing report that indicates a characteristic of an object within an environment. The characteristic is determined based on the sensing operation. The at least one processor is also configured to execute the processor-readable code to cause the at least one processor to identify a position of the object within the environment based on the positioning report and based on the characteristic indicated by the sensing report.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 11 is a flow diagram illustrating an example process that supports sensing assisted positioning according to one or more aspects.

Like reference numbers and designations in the various drawings indicate like elements.

DETAILED DESCRIPTION

Figure 1:
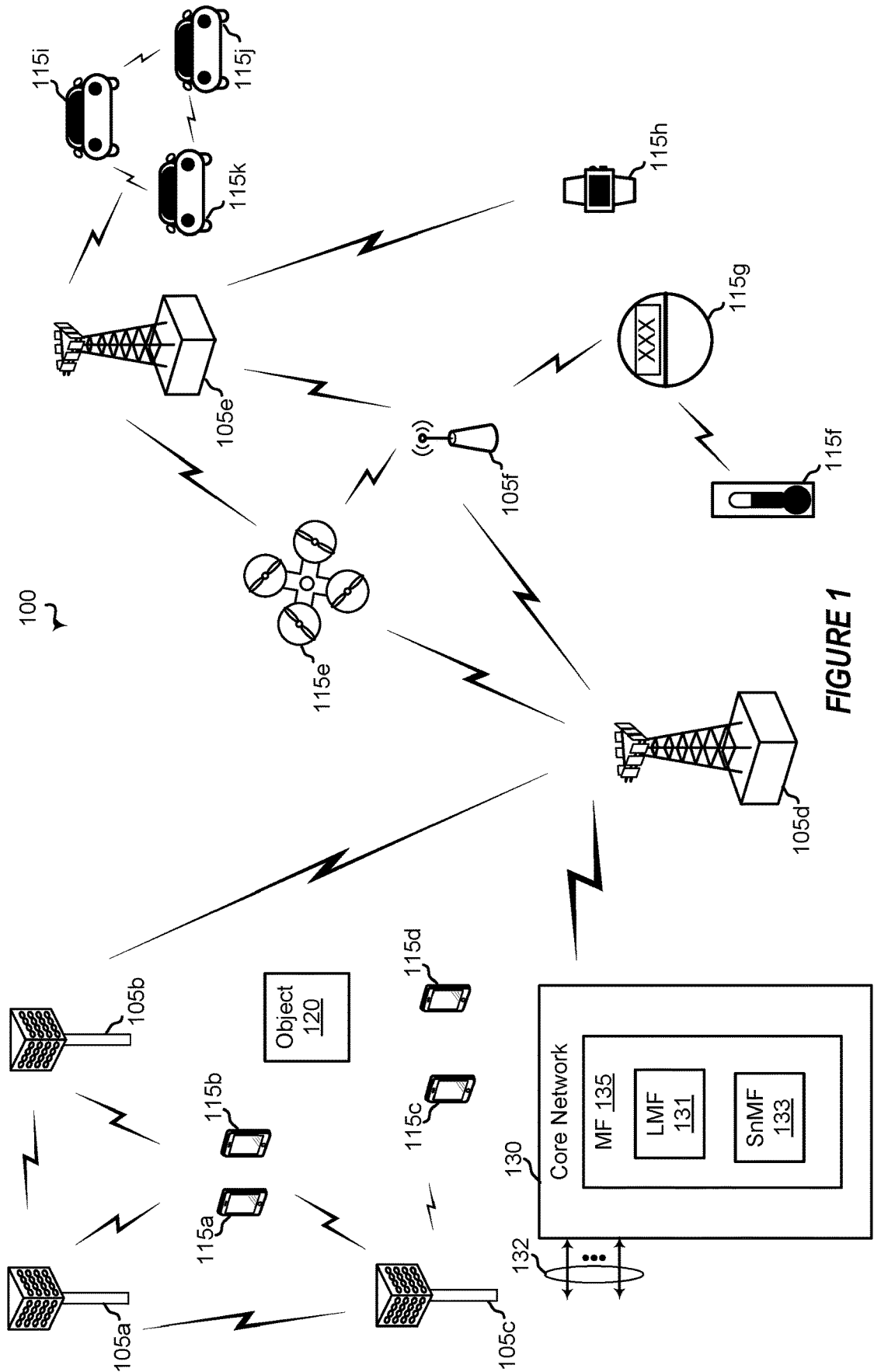
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support sensing assisted positioning. For example, the present disclosure describes identification of a position of an object in an environment based on sensing information in addition to positioning information. To illustrate, a core network that includes a location management function (LMF) and a sensing management function (SnMF) may transmit configuration information to configure one or more network entities, dispersed throughout the environment, to perform one or more positioning operations and one or more sensing operations. Based on the configuration information, received from the core network, the one or more network entities may perform the one or more positioning operations and the one or more sensing operations. The one or more network entities may transmit, to the LMF, the SnMF, or both, positioning information based on the one or more positioning operations, and sensing information based on the one or more sensing operations. The LMF may determine a location of an object in the environment based on the positioning information and based on the sensing information.

Particular implementations of the subject matter described in this disclosure may be implemented to realize one or more of the following potential advantages or benefits. In some aspects, the present disclosure provides techniques for supporting sensing assisted positioning that enhance an accuracy, a precision, or both of a determination of a location of an object in an environment. To elaborate, positioning information may lack data about a characteristic of an object that may assist in determining the position of the object. For instance, positioning information, obtained from a positioning operation, may lack information about a direction of an object relative to the network entity that performs the positioning operation, a velocity of an object, an angle at which the object may be displaced relative to the network entity that performs the positioning operation, or any of the foregoing. In contrast, a sensing operation, performed by the same network entity that performs the positioning operation or by a different network entity, may generate information that indicates a direction of the object, a velocity of the object, an angle of the object, or other characteristics of the object not determinable by the positioning operation. By combining positioning information based on the positioning operation, and sensing information based on the sensing operation, an accuracy, a precision, or both of a determination of a position of an object may be improved or enhanced as compared to a determination of the position of an object based on the position information and not based on the sensing information. Improving the accuracy, the precision, or both of a position determination of an object within the environment may enhance autonomous navigation of robotic vehicles. For example, an autonomous vehicle that is provided with an accurate and precise map of objects within its environment is less likely to collide with another object.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication and positioning system according to one or more aspects. The wireless communication and positioning system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FI105rG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*c*. Additionally, V2V mesh network may include or correspond to a vehicle-to-everything (V2X) network between UEs 115*i*-115*k* and one or more other devices, such as UEs 115*x*, 115*y*.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking. Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to management function (MF) 135, such as Location Management Function (LMF) 131, Sensing Management Function (SnMF) 133, or an Access and Mobility Management Function (AMF) (not depicted), which is an entity in the 5G Core Network (5GC) supporting various functionality, such as managing support for different location services. SnMF 133 may be configured to manage support for sensing operations for one or more sensing operations or sensing services for one or more devices, such as one or more UEs 115, one or more base stations 105, one or more transmission reception points (TRPs), or a combination thereof. For example, SnMF 133 may include one or more servers, such as multiple distributed servers. Base stations 105 may forward sensing messages to SnMF 133 and may communicate with SnMF 133 via a NR Positioning Protocol A (NRPPa). SnMF 133 is configured to control sensing parameters for UEs 115, and SnMF 133 can provide information to the base stations 105 and UE 115 so that action can be taken at UE 115, base station 105, or another device. LMF 131 may include one or more servers, such as multiple distributed servers. Base stations 105 may forward location messages to LMF 131 and may communicate with LMF 131 via a NR Positioning Protocol A (NRPPa). LMF 131 is configured to control the positioning parameters for UEs 115 and LMF 131 can provide information to the base stations 105 and UE 115 so that action can be taken at UE 115. In some implementations, UE 115 and base station 105 are configured to communicate with LMF 131 via the AMF. As explained more fully below, core network 130 is configured to facilitate determination of a position of object 120. Object 120 may be any object within an environment, such as an environment in which one or more of the components of the wireless network 100 are disposed.

Figure 2:
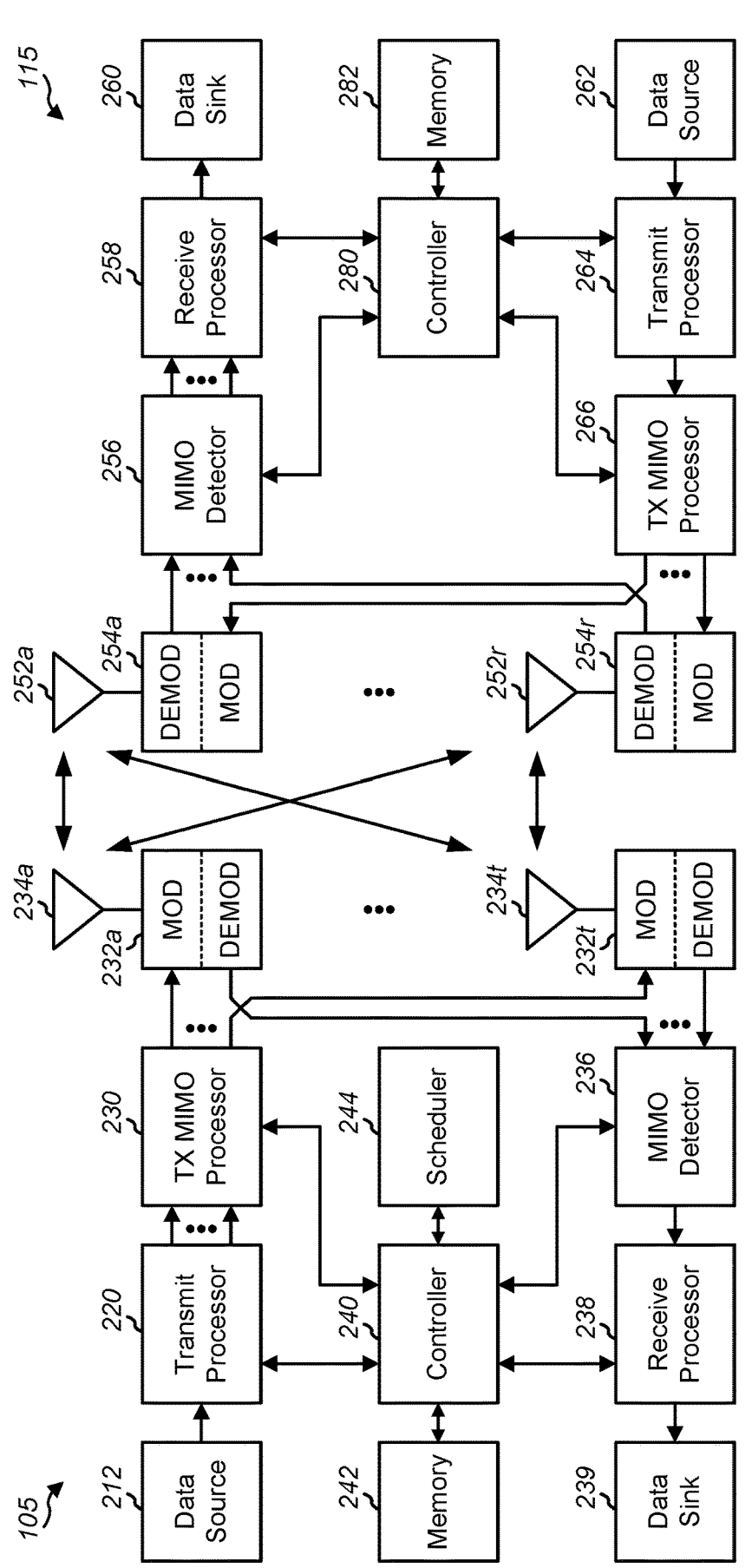
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE

115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in or described with reference to FIGS. 10, 11, and 13 or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
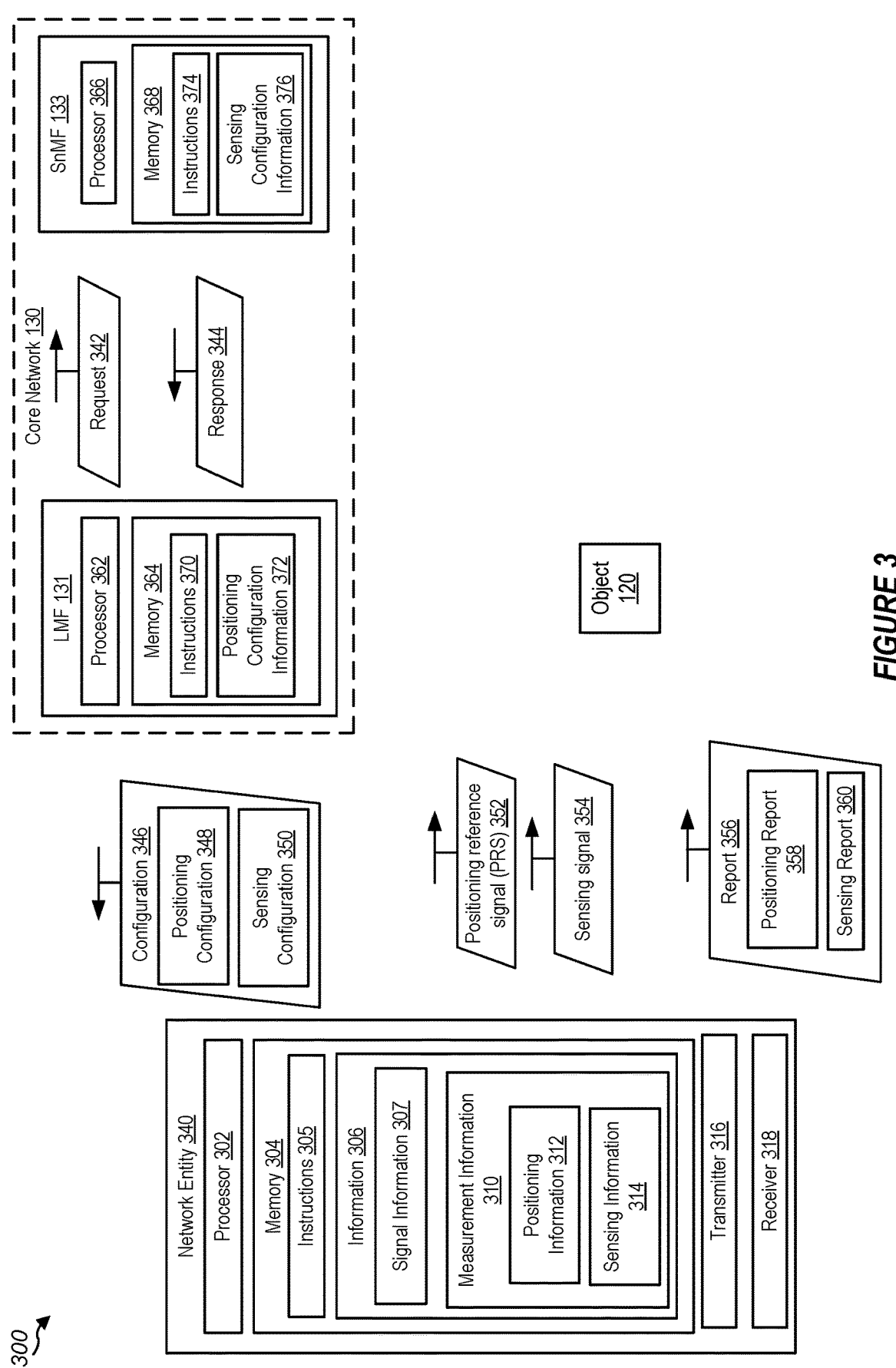
FIG. 3 is a block diagram illustrating an example positioning system that supports sensing assisted positioning according to one or more aspects.

FIG. 3 is a block diagram of an example positioning system 300 that supports sensing assisted positioning according to one or more aspects. In some examples, positioning system 300 may implement aspects of wireless network 100. Sensing system 300 includes core network 130 and network entity 340. Network entity 340 may include or correspond to a TRP, base station 105, UE 115, or an combination thereof. Although one network entity 340 is illustrated, in other implementations, positioning system 300 may generally include multiple network entities. One or more network entities of positioning system 300 may include or correspond to a TRP, base stations 105, or UEs 115. Positioning system 300 may be configured to determine a position of an object located within an environment, such as a position of object 120. Object 120 may correspond to any object, whether stationary or mobile.

Network entity 340 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, network entity 340 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 305 and information 306. Instructions 305 may include processor-readable code, program code, one or more software instructions, or the like, as illustrative, non-limiting examples. Information 306 may include signal information 307 and measurement information 310. Signal information 307 may include information associated with generation of one or more positioning reference signals 352 (hereinafter collectively referred to as "PRS 352"), one or more sensing signals 354 (hereinafter collectively referred to as "sensing signal 354"), or a combination thereof. PRS 352, sensing signal 354, or both may include or correspond to any electromagnetic signal that may be partially or completely reflected by a surface of object 120. For instance, PRS 352, sensing signal 354, or both may include or correspond to a radio frequency (RF) signal, a microwave signal, an infrared (IR) signal, or any combination thereof. Signal information 307 may include a modulation pattern, a frequency value, a bandwidth, an amplitude value, a phase value, or a combination thereof that correspond to generation, by network entity 340, of PRS 352, sensing signal 354, or both.

Measurement information 310 may include positioning information 312, sensing information 314, or both. In some implementations, measurement information 310 may also include capability information, indicating a capability of network entity 340 to perform positioning operations, sensing operations, or both. Positioning information 312 may include or correspond to positioning information generated by network entity 340 based on performance, by network entity 340, of a positioning operation. Accordingly, positioning information 312 may include positioning measurements resulting from the positioning operation. For example, positioning information 312 may include or correspond to round trip time (RTT) values, time of arrival (TOA) values, time difference of arrival (TDOA) values, angle of arrival (AOA) values, a reference signal time difference (RSTD), a reference signal received power (RSRP), or a reference signal received quality (RSRQ), or any combination thereof, each determined based on the positioning operation. Additionally, positioning information 312 may include coordinates of an object, such as object 120, within an environment.

Sensing information 314 may include or correspond to sensing measurements generated by network entity 340 based on performance, by network entity 340, of a sensing operation. Sensing information 314 may include or correspond to a range value or a distance value indicative of a distance between network entity 340 and object 120, an angle value indicating an angle of a beam of sensing signal 354 relative to network entity 340 and object 120, a velocity value corresponding to a velocity of object 120, or a combination thereof. Additionally or alternatively, sensing information 314 may include outputs of a sensing operation, such as a Doppler map, a point cloud, an indication of a quantity of objects (e.g., object 120) identified in an environment in which network entity 340 has been deployed, or a combination thereof.

Transmitter 316 is configured to transmit PRS 352, sensing signal 354, reference signals, control information, data, or any combination thereof to or within an environment, to one or more other devices, or a combination thereof, and receiver 318 is configured to receive a reflected PRS, a reflected signal, references signals, synchronization signals, control information, data, or any combination thereof from the environment, from one or more other devices, or a combination thereof. For example, transmitter 316 may transmit PRS 352, sensing signal 354, signaling, control information and data to, and receiver 318 may receive a reflected PRS, a reflected sensing signal, signaling, control information and data from, core network 130, the environment, or both. In some implementations, transmitter 316 and receiver 318 may be integrated in one or more transceivers. Additionally or alternatively, transmitter 316 or receiver 318 may include or correspond to one or more components of base station 105, UE 115, or both as described with reference to FIG. 2.

In some implementations, network entity 340 may include one or more antenna arrays. The one or more antenna arrays may be coupled to transmitter 316, receiver 318, or a communication interface. The antenna array may include multiple antenna elements configured to perform positioning operations, sensing operations, wireless communications, or a combination thereof. In some implementations, the antenna array may be configured to perform positioning operations, sensing operations, wireless communications, or a combination thereof using different beams, also referred to as antenna beams. The beams may include TX beams associated with PRS 352, sensing signals 354, or both and RX beams associated with reflected PRS, reflected sensing signals, or both. To illustrate, the antenna array may include multiple independent sets (or subsets) of antenna elements (or multiple individual antenna arrays), and each set of antenna elements of the antenna array may be configured to perform a positioning operation, a sensing operation, to communicate, or a combination thereof using a different respective beam that may have a different respective direction than the other beams. For example, a first set of antenna elements of the antenna array may be configured to perform a positioning operation, a sensing operation, or to communicate via a first beam having a first direction, and a second set of antenna elements of the antenna array may be configured to perform a positioning operation, a sensing operation, or to communicate via a second beam having a second direction. In other implementations, the antenna array may be configured to perform a positioning operation, to perform a sensing operation, or to communicate via more than two beams. Alternatively, one or more sets of antenna elements of the antenna array may be configured to concurrently generate multiple beams, for example using multiple RF chains of UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Network entity 340 may include one or more components as described herein with reference to base station 105, UE 115, or both. In some implementations, network entity 340 is a 5G-capable device, a 6G-capable device, or a combination thereof.

Core network 130 may include a variety of components (such as structural, hardware components) used for carrying out one or more functions described herein. For example, these components may include LMF 131, SnMF 133, or both.

LMF 131 may include one or more processors 362 (hereinafter referred to collectively as "processor 362") and one or more memory devices 364 (hereinafter referred to collectively as "memory 364"). Additionally, while not illustrated, LMF 131 may include a communication interface configured for wired communication, wireless communication, or both. Memory 364 includes or is configured to store instructions 370 and positioning configuration information 372. Additionally, memory 364 may store capability information indicating a capability of LMF 131 to process positioning information 312, sensing information 314, or both. Further, the capability information may indicate a functionality of LMF 131 to initiate performance of a positioning operation, a sensing operation, or both by a network entity, such as network entity 340. Instructions 370 may include processor-readable code, program code, one or more software instructions, or the like, as illustrative, non-limiting examples, each configured to implement the functionality described herein. Positioning configuration information 372 may include positioning configuration information to generate positioning configuration 348, position information 312 included in positioning report 358 and received from network entity 340, or a combination thereof. Positioning configuration information 372 may include an amplitude value, a frequency value, a phase value, modulation data, or a combination thereof to configure network entity 340 to generate PRS 352. Additionally or alternatively, the positioning configuration information may include an indication of types of positioning measurements to be obtained by network entity 340.

SnMF 133 may include one or more processors 366 (hereinafter referred to collectively as "processor 366") and one or more memory devices 368 (hereinafter referred to collectively as "memory 368"). Additionally, while not illustrated, SnMF 133 may include a communication interface configured for wired communication, wireless communication, or both. Memory 368 includes or is configured to store instructions 374 and sensing information 376. Additionally, memory 368 may include capability information indicating a capability of SnMF 133 to process positioning information 312, sensing information 314, or both. Further, the capability information may indicate a functionality of SnMF 133 to initiate performance of a positioning operation, a sensing operation, or both by a network entity, such as network entity 340. Instructions 374 may include processor-readable code, program code, one or more software instructions, or the like, as illustrative, non-limiting examples, each configured to implement the functionality described herein. Sensing configuration information 376 may include sensing configuration information to generate sensing configuration 350, sensing information 314 included in sensing report 360 and received from network entity 340, or a combination thereof. Sensing configuration information 376 may include an amplitude value, a frequency value, a phase value, modulation data, or a combination thereof to configure network entity 340 to generate sensing signal 354. Additionally or alternatively, sensing configuration information 376 may include an indication of types of sensing measurements to be performed by or obtained by network entity 340, sensing outputs to be obtained by network entity 340, or a combination thereof. For example, types of sensing measurements may include a distance between network entity 340 and object 120, an angle measurement indicating an angle formed by a beam of sensing signal 354 and object 120, a velocity of object 120, or a combination thereof. Sensing outputs may include a Doppler map, a point cloud, an identity of objects (e.g., object 120) detected in an environment, or a combination thereof.

During operation of positioning system 300, core network 130 may be configured to coordinate a positioning operation and a sensing operation to enhance an accuracy, a precision, or both of a determination of a position of an object, such as object 120 in an environment. To achieve the foregoing, LMF 131 may access or receive sensing information 314, received through a sensing operation, and positioning information 312, received from a positioning operation. To obtain sensing information 312 and positioning information 314, an iterative positioning and sensing session may be initiated between LMF 131 and SnMF 133 via one or more requests 342 (hereinafter referred to collectively as "request 342") and one or more responses 344 (hereinafter referred to collectively as "response 344"). Additionally, or alternatively, to obtain sensing information 312 and positioning information 314, a joint positioning and sensing session may be established between LMF 131 and SnMF 133. In the iterative positioning and sensing session and in the joint positioning and sensing session, core network 130, through operation of LMF 131 and SnMF 133, may initiate performance of a positioning operation, a sensing operation, or both by one or more network entities, such as network entity 340.

To initiate the positioning operation, the sensing operation, or both, core network 130 may be configured to generate configuration 346. Core network 130 may transmit configuration 346 to network entity 340, which network entity 340 may receive. Configuration 348 may include positioning configuration 348, sensing configuration 350, or both. As further explained below, positioning configuration 348 may include one or more parameters generated by core network 130 (e.g., by LMF 131) to configure network entity 340 to perform a positioning operation. For example, positioning configuration 348 may include one or more parameters to configure network entity 340 to generate PRS 352. The one or more parameters may include a frequency value, an amplitude value, a phase value, modulation data, or any combination thereof, as illustrative, non-limiting examples. Similarly, sensing configuration 350 may include one or more parameters generated by core network 130 (e.g., by SnMF 133) to configure network entity 340 to perform a sensing operation. For instance, sensing configuration 350 may include one or more parameters to configure network entity 340 to generate sensing signal 354. The one or more parameters also may include a frequency value, an amplitude value, a phase value, modulation data, or any combination thereof, as illustrative, non-limiting examples. Additionally, or alternatively, the one or more parameters may indicate a type of sensing measurements that network entity 340 is to obtain through performance of a sensing operation. The type of sensing measurements may include a range or a distance between network entity 130 and the object (e.g., object 120), an angle measurement indicating an angle formed by a beam transmitted during the sensing operation and object 120, a velocity of object 120, or a combination thereof. While FIG. 3 depicts positioning configuration 348 and sensing configuration 350 as being sent in a same message, it is understood that positioning configuration 348, sensing configuration 350, or both may be sent in different messages or sent separately.

To perform the sensing operation, network entity 340 may be configured to generate and transmit sensing signal 354. Sensing signal 354 may impinge upon one or more objects present in an environment, such as an environment in which network entity 340 has been deployed. The sensing signal 354 may at least partially reflect off of a surface of object 120 as a reflected sensing signal. In a monostatic sensing operation, network entity 340 may be configured to receive the reflected sensing signal and generate sensing information 314 based on sensing signal 354, reflected sensing signal, or both. In a bistatic sensing operation, a second network entity (not depicted) may receive and process the reflected sensing signal.

To perform the positioning operation, network entity 340 may be configured to generate and transmit PRS 352. PRS 352 may impinge upon one or more objects present in an environment, such as an environment in which network entity 340 has been deployed. PRS 352 may at least partially reflect off of a surface of object 120 as a reflected PRS. In a monostatic positioning operation, network entity 340 may be configured to receive the reflected PRS and generate positioning information 312 based on the reflected PRS. In a bistatic positioning operation, a second network entity (not depicted) may receive and process the reflected PRS.

Network entity 340 may be configured to generate report 356. Report 356 may include positioning report 358, sensing report 360, or both. In some implementations, positioning report 358 and sensing report 360 may be transmitted separately. Positioning report 358 may include positioning information 312 generated based on performance of a positioning operation by network entity 340. As above, positioning information 312 may include positioning measurements generated as a result of the positioning operation. Sensing report 360 may include sensing information 314 generated based on performance of a sensing operation by network entity 340. As above, sensing information 314 may include sensing measurements generated as a result of the sensing operation. Network entity 340 may be configured to transmit report 356 to core network 130.

Core network 130 may be configured to receive report 356. Based on positioning information 312, sensing information 314, or both, core network 130 may determine a position of object 120. Since the position determination is based on both positioning information 312 and sensing information 314, the position determination of object 130 may be more accurate, more precise, or both than if the position determination were based on positioning information 312 alone. To elaborate, since sensing information 314 may include data about object 120 that positioning information 312 may lack, core network 130 may generate an enhanced position determination of object 120.

In some implementations of the iterative positioning and sensing session, LMF 131 may transmit, to SnMF 133, request 342 that is associated with a sensing operation. SnMF 133 may initiate the sensing operation. Additionally, LMF 131 may receive, from SnMF 133, response 344. Response 344 may be based on request 342. Moreover, LMF 131 may identify a position of object 120 in an environment based on the response.

In some implementations, request 342 includes a first indicator that indicates an area within the environment in which the sensing operation is to be performed. An area within the environment may be a segment of space within an environment in which a sensing operation is to be performed. Additionally, request 342 may include a second indicator that indicates an identity of one or more network entities, such as network entity 340, to be configured to perform the sensing operation. Moreover, request 342 may include a third indicator that indicates an expected sensing result. The foregoing indicators are not mutually exclusive of one another and two or more indicators may be combined.

In some implementations, LMF 131 may be configured to update an initial estimate of object 120 based on response 344. For example, prior to transmitting request 342, LMF 131 may receive, from SnMF 133, an initial estimate of the position of object 120. Alternatively, LMF 131 may itself generate an initial estimate of the position of object 120.

In some implementations, network entity 340 may be a TRP or a UE. Since positioning system 300 may include a plurality of network entities, some of the network entities may be TRPs, while other network entities may be UEs. Additionally, or alternatively, one or more of the network entities may be a base station (e.g., 105).

In some implementations, response 344 may include object information that indicates a presence of multiple objects within an area of the environment. Additionally, response 344 may include an indication of the area indicated by the request, measurement information associated with a characteristic of the object, or a combination thereof.

In some implementations, to update the initial estimate of the position of object 120 based on response 344, LMF 131 may transmit multiple requests, such as multiple of request 342, where each request is associated with the sensing operation. The multiple requests may be in addition to request 342 that is associated with the sensing operation. LMF 131 may receive multiple responses, such as multiple of response 344, based on the multiple requests. Each response of the multiple responses may be based on a different request of the multiple requests. LMF 131 may identify the position of object 120 based on the multiple responses. For example, identifying the position of object 120 may include determining an estimated position of object 120 based on an initial response (e.g., a first response) of the multiple responses. Thereafter, LMF 131 may iteratively update the estimated position of object 120 for each received subsequent response of the multiple responses.

In some implementations, an iterative approach to determining a position of an object, such as object 120 may be implemented. For example, LMF 131 may estimate a position of object 120. The estimate may be an initial hypothesis associated with the position of the object 120 based on information (e.g., position information 312) that may be available to LMF 131 prior to initiation of a positioning operation. LMF 131 may send a request, such as request 342, to SnMF 133, and the request may result in initiation, by SnMF 133, of a sensing operation. SnMF 133 may send a response, such as response 344, to LMF 131, and response 344 may include sensing information 314 obtained as a result of initiation of the sensing operation (e.g., performance of the sensing operation by a network entity, such as network entity 340). Based on sensing information 314 included in response 344, LMF 131 may update (e.g., refine) its initial estimate of the position of object 120. LMF 131 may iteratively send additional requests (e.g., for performance of a sensing operation) and receive additional responses (e.g., that include sensing information 314) and may update its estimate of the position of object 120 accordingly. In this manner, increasingly more accurate or more precise estimates of the position of object 120 may be generated.

In some implementations, request 342 may indicate an expected sensing result, such as a result expected from performance of a sensing operation. The expected sensing result may include a distance measurement that indicates a distance between one or more network entities configured to perform the sensing operation, such as network entity 340, and object 120. Additionally, the expected sensing result may include an angle measurement that indicates a beam angle associated with the sensing operation and the object. The beam angle may include or correspond to an angle between a beam of sensing signal 354 and one or more objects, such as object 120. Further, the expected sensing result may include a velocity measurement that indicates a velocity of object 120 relative to the one or more network entities, such as network entity 340, configured to perform the sensing operation.

In lieu of, or in addition to, the iterative approach described above, in some implementations, LMF 131 and SnMF 133 may jointly process positioning information 312, including positioning measurements, and sensing information 314, including sensing measurements, to derive a position of an object, such as object 120. In some implementations, LMF 131 and SnMF 133 may exchange data, such as signaling information, to establish the joint positioning and sensing session. For example, the data may include an exchange of capability indicating that each of LMF 131 and SnMF 133 support a joint positioning and sensing operation. Additionally, in some implementations, LMF 131 may identify, to the SnMF 133, a set of network entities, such as network entity 340, that the SnMF 133 may configure to perform sensing operations. Further, LMF 131 may identify, to SnMF 133, sensing measurements to be generated by one or more network entities of the set of network entities. Some of the network entities may be TRPs while others of the network entities may be UEs.

In some implementations, LMF 131 and SnMF 133 may exchange an itemization of reference signal resources that may be deployed for performance, by network entity 340, of positioning measurements, sensing measurements, or both. For example, the reference signal resources may include PRS configurations that network entity 340 may be configured to implement to perform a positioning operation.

In some implementations, LMF 131 may specify, to SnMF 133, sensing information 314, such as sensing measurements, that one or more network entities, such as network entity 340, are to be configured to obtain or generate. Such sensing information 314 may include Doppler maps, ranges, angle maps, point clouds, identification of any objects found through performance of a sensing operation, or any combination thereof.

In some implementations, LMF 131, SnMF 133, or both, may configure network entities, such as network entity 340, to perform positioning operations, sensing operations, or both. For instance, LMF 131, SnMF 133, or both, may generate configuration 346 to configure network entity 340 to perform positioning operations, sensing operations, or both. To illustrate, in some implementations, LMF 131 may generate positioning configuration 348, while SnMF 133 may generate sensing configuration 350. Each of positioning configuration 348 and sensing configuration 350 may be transmitted concurrently. Alternatively, positioning configuration 348 and sensing configuration 350 may be sent separately at a same instance of time or each at different instances of time. In other implementations, positioning configuration 348 may be transmitted, while sensing configuration 350 might not transmitted or vice versa.

In some implementations, LMF 131. SnMF 133, or both may configure a base station (e.g., 105) to implement a positioning operation, a sensing operation, or both. The base station may, likewise, configure one or more network entities, such as network entity 340, to perform a positioning operation, a sensing operation, or both.

In some implementations, after collecting positioning information 312, sensing information 314, or both, network entity 340 transmits positioning information 312 to LMF 131. With regard to sensing information 314, network entity 340 may transmit sensing information 314 to SnMF 133, which may provide sensing information 314 to LMF 131. Alternatively, network entity 340 may be configured (e.g., based on configuration 346) to transmit sensing information 314 to LMF 131. For example, during an exchange between LMF 131 and SnMF 133 of capability information, LMF 131 may indicate a capability to process sensing information 314 to SnMF 133. Accordingly, based on the capability information indicating an ability of LMF 131 to process sensing information 314, SnMF 133 may configure network entity 133 to provide sensing information 314 to LMF 131.

As described with reference to FIG. 3, the present disclosure provides techniques for supporting sensing assisted positioning. The techniques described enhance an accuracy, a precision, or both of a determination of a location of object 120 in an environment. To elaborate, positioning information 312 may lack data about a characteristic of object 120 that may assist in determining a position of object 120. For instance, positioning information 312, obtained from a positioning operation, may lack information about a direction of object 120 relative to a network entity, such as network entity 340, that performs the positioning operation, a velocity of object 120, an angle at which object 120 may be displaced relative to the network entity, such as network entity 340, that performs the positioning operation, or any combination thereof. In contrast, a sensing operation, performed by the same network entity that performs the positioning operation (e.g., network entity 340) or by a different network entity, may generate information that indicates a direction of object 120, a velocity of object 120, an angle of object 120, or other characteristics of object 120 not determinable by the positioning operation.

By combining positioning information 312, obtained by the positioning operation, and sensing information 314, obtained by the sensing operation, an accuracy, a precision, or both of a determination of a position of object 120 may be enhanced. Improving the accuracy, the precision, or both of a position determination of object 120 within the environment may support a range of applications. For instance, sensing assisted positioning may improve autonomous navigation of robotic vehicles. To elaborate, an autonomous vehicle, provided with an accurate and precise map of objects, such as object 120, in its environment, may be less likely to collide with these objects.

Referring to FIGS. 4-9, ladder diagrams illustrating examples of sensing assisted positioning according to one or more aspects are shown. For example, each of FIGS. 4-9 shows a different example of a positioning system 400. Positioning system 400 may include or correspond to positioning system 300. Positioning system 400 includes core network 130 and network entity 340. Core network includes LMF 131 and SnMF 133. It is noted that like reference numbers and designations in FIGS. 4-9 may include or indicate like operations. Additionally, with reference to FIGS. 7-9, positioning system 400 includes base station 105.

Figure 4:
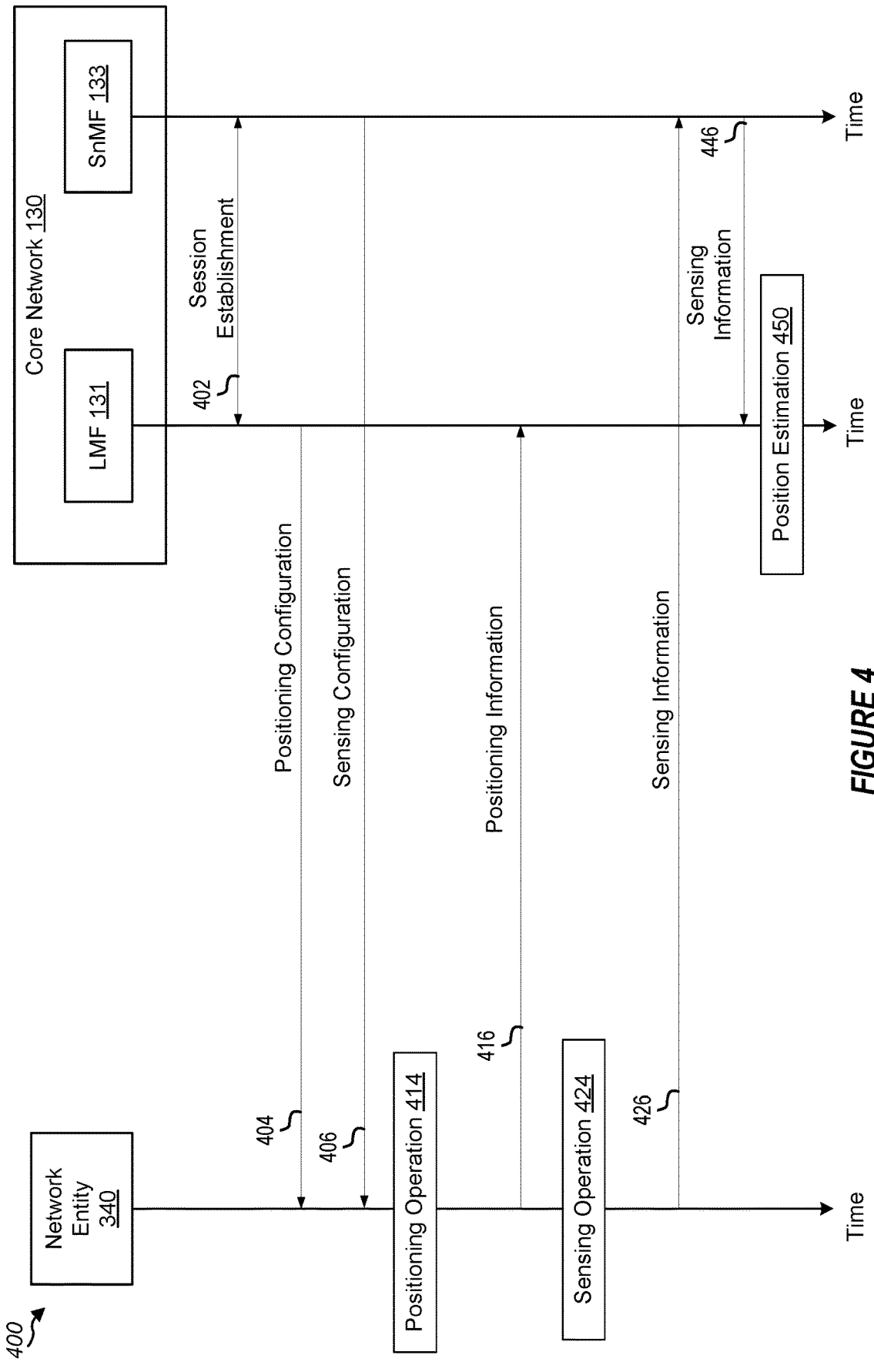
FIG. 4 is a ladder diagram illustrating an example of sensing assisted positioning according to one or more aspects.

Referring to FIG. 4, a ladder diagram illustrating an example of sensing assisted positioning according to one or more aspects is depicted. In particular, FIG. 4 illustrates establishment of a joint sensing and positioning session 400 among LMF 131, SnMF 133, and network entity 340. To illustrate, at 402, the joint sensing and positioning session is established between LMF 131 and SnMF 133. To establish the joint sensing and positioning session, LMF 131 and SnMF 133 may exchange capability information, mutually identify one or more network entities (e.g., network entity 340) capable of performing a sensing operation, a positioning operation, or both, or combinations thereof. The capability information may include or correspond to a capability of LMF 131, a capability of SnMF 133, a capability of one or more network entities (e.g., network entity 340), or combinations thereof. The capability information may include or correspond to the capability information described with reference to FIG. 3 that may be stored in memory 364, memory 368, or both.

At 404, LMF 131 may generate and send a positioning configuration to network entity 340. The positioning configuration may include or correspond to positioning configuration 348. The positioning configuration may include one or more parameters to configure network entity 340 to perform a positioning operation. For instance, the one or more parameters may correspond to generation, by network entity 340, of the one or more PRSs. In particular, the positioning configuration may include one or more parameters that include or correspond to a first value associated with a frequency of the PRS, a second value associated with an amplitude of the PRS, a third value associated with the phase of the PRS, a modulation pattern imposed on the PRS, or any combination thereof.

At 406, SnMF 133 may generate and send a sensing configuration to network entity 340. The sensing configuration may include or correspond to sensing configuration 350. The sensing configuration may include one or more parameters to configure network entity 340 to perform a sensing operation. For instance, the one or more parameters may correspond to generation, by network entity 340, of the one or more sensing signals. In particular, the sensing configuration may include one or more parameters that include or correspond to a first value associated with a frequency of the sensing signal, a second value associated with an amplitude of the sensing signal, a third value associated with the phase of the sensing signal, a modulation pattern imposed on the sensing signal, or any combination thereof.

While FIG. 4 depicts the positioning configuration and the sensing configuration as being sent to network entity 340 at different time intervals, in some implementations, the positioning configuration and the sensing configuration may be transmitted concurrently. Additionally, while FIG. 4 illustrates that the positioning configuration is sent prior to the sensing configuration, in some implementations, the sensing configuration may be sent prior to the positioning configuration.

At 414, network entity 340 performs a positioning operation. The positioning operation may be performed based on the positioning configuration. For example, the positioning operation may include generation and transmission of a PRS, such as PRS 352, by network entity 340. The PRS may be generated based on one or more parameters included in the positioning configuration. The PRS may impinge upon one or more objects present in an environment in which network entity 340 has been deployed. The one or more objects may include or correspond to object 120. Accordingly, surfaces of the one or more objects may at least partially reflect the PRS to generate a reflected PRS. The reflected PRS may be received by network entity 340. Additionally, or alternatively, the reflected PRS may be received by another network entity. Based on the transmitted PRS and the reflected PRS, network entity 340 (or another network entity) may be configured to generate positioning information. The positioning information may include or correspond to positioning information 312. Accordingly, the positioning information may include positioning measurements associated with a position of the one or more objects. For example, the positioning information may include or correspond to RTT values, TOA values, TDOA values, or AOA values determined based on the transmitted PRS and received reflected PRS.

At 416, network entity 340 may transmit the positioning information to LMF 131. The positioning information may include or correspond to positioning information 312 or positioning report 358. While FIG. 4 depicts that network entity 340 performs the positioning operation after network entity 340 receives the sensing configuration, in some implementations, network entity 340 may perform the positioning operation prior to receipt, by network entity 340, of the sensing configuration. Additionally, while FIG. 4 depicts that network entity 340 sends the positioning information to LMF 131 after performing the positioning operation, network entity 340 may send the positioning information to LMF 131 after performing the sensing operation.

At 424, network entity performs a sensing operation. The sensing operation may be performed based on the sensing configuration. For example, the sensing operation may include generation and transmission of a sensing signal, such as sensing signal 354, by network entity 340. While FIG. 4 depicts that network entity 340 performs the sensing operation after network entity 340 receives the positioning configuration, in some implementations, network entity 340 may perform the sensing operation prior to receipt, by network entity 340, of the positioning configuration. The sensing signal may be generated based on one or more parameters included in the sensing configuration. The sensing signal may impinge upon one or more objects present in an environment in which network entity 340 has been deployed. Accordingly, surfaces of the one or more objects may at least partially reflect the sensing signal to generate a reflected sensing signal. The reflected sensing signal may be received by network entity 340. Additionally or alternatively, the reflected sensing signal may be received by another network entity. Based on the transmitted sensing signal and the reflected sensing signal, network entity 340 (or another network entity) may be configured to generate sensing information. The sensing information may include or correspond to sensing information 314. Accordingly, the sensing information may include sensing measurements associated with one or more characteristics of the object (e.g., 120). For example, the sensing information may include or correspond to a range or a distance between or associated with network entity 340 and the object, an angle measurement indicating an angle formed by a beam transmitted during the sensing operation and the object, a velocity of the object, or a combination thereof. At 426, network entity 340 may transmit the sensing information to SnMF 133.

At 446, SnMF 133 may send the sensing information to LMF 131. In some implementations, SnMF 133 may send the sensing information to LMF 131 before LMF 131 receives the positioning information. The sensing information may include or correspond to sensing information 314 or sensing report 360.

At 450, LMF 131 may perform a position estimation of the object based on the positioning information and based on the sensing information. The position estimation may include or correspond to a position of the object, such as coordinates of the object. By generating the position estimation based on both positioning information and sensing information, the position estimation may be more accurate, more precise, or both than a position estimation that is based solely on positioning information.

Figure 5:
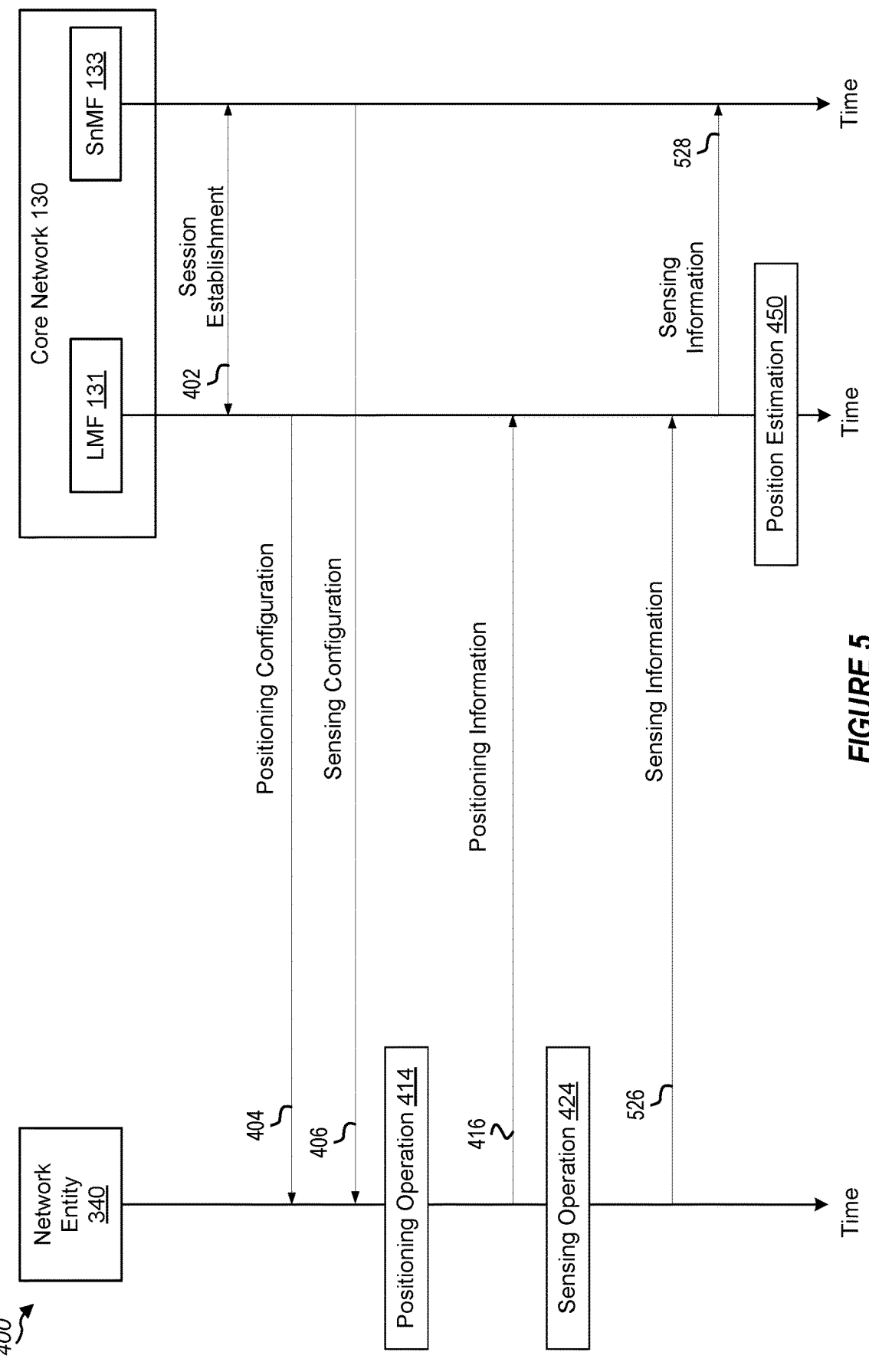
FIG. 5 is a ladder diagram illustrating an example of sensing assisted positioning according to one or more aspects.

FIG. 5 is a ladder diagram illustrating an example of sensing assisted positioning according to one or more aspects. FIG. 5 depicts an implementation in which network entity 340 generates sensing information based on the sensing operation, at 424, and, at 526, sends the sensing information to LMF 131. While FIG. 5 depicts that network entity 340 sends sensing information to LMF 131 after sending positioning information to LMF 131, in some implementations, network entity 340 may send sensing information to LMF 131 before network entity 340 sends positioning information to LMF 131, and LMF 131, at 528, may send the sensing information to SnMF 133 before LMF 131 receives the positioning information from network entity 340.

It is noted that, during the session establishment at 402 of FIG. 5, it may be established, by information exchange between LMF 131 and SnMF 133, that LMF 131 includes functionality to itself receive, process, and send the sensing information. At 528, LMF 131 sends the sensing information to SnMF 133. Alternatively, in some implementations, LMF 131 may not send sensing information to SnMF 133. In other implementations, LMF 131 may only send sensing information to SnMF 133 after LMF 131 performs position estimation 450. Accordingly, as compared to the example of FIG. 4, in which SnMF 133 receives the sensing information and sends the sensing information to LMF 131, as shown in FIG. 5, LMF 131 receives the sensing information from network entity 340.

Figure 6:
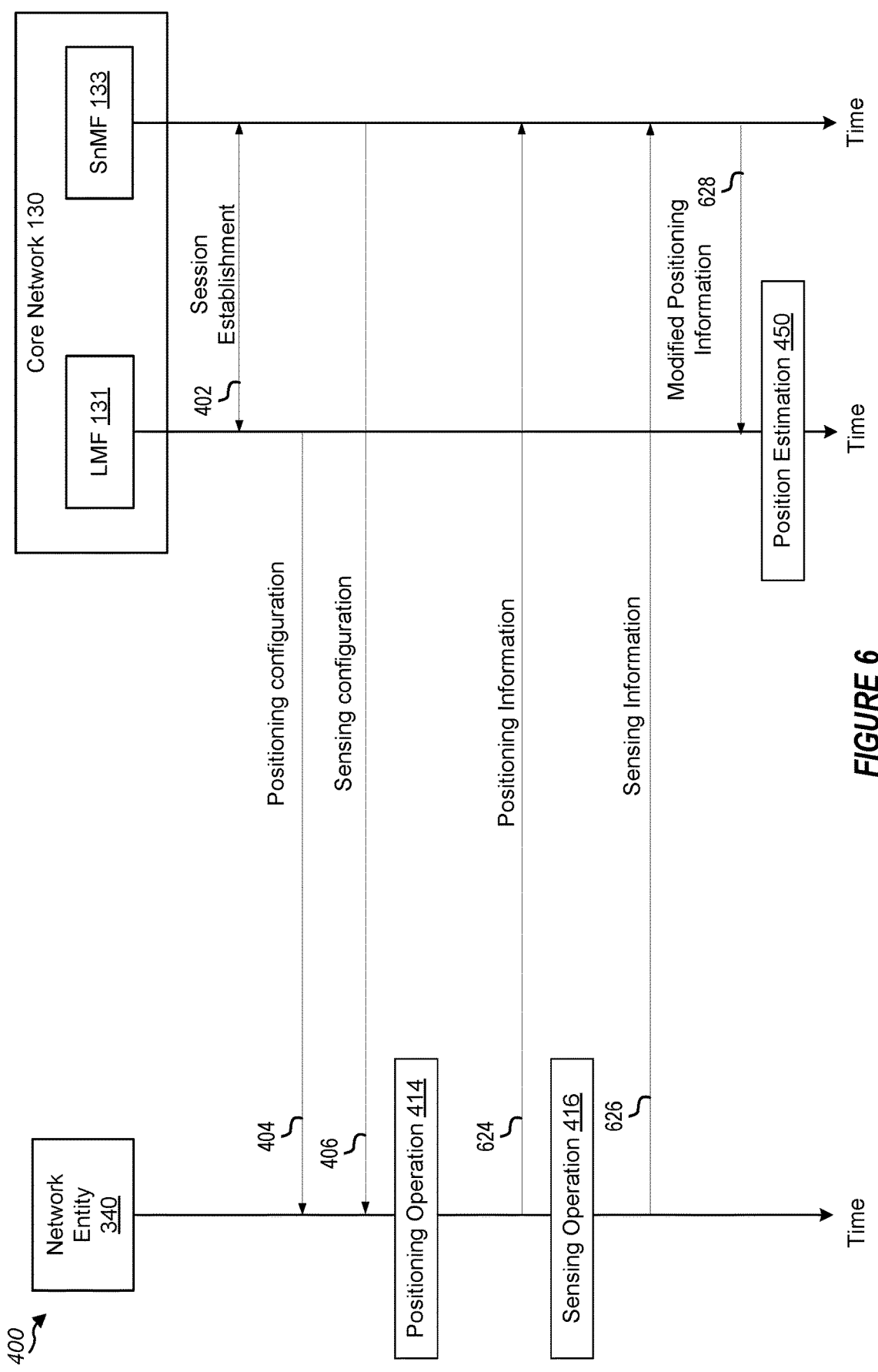
FIG. 6 is a ladder diagram illustrating an example of sensing assisted positioning according to one or more aspects.

FIG. 6 is a ladder diagram illustrating an example of sensing assisted positioning according to one or more aspects. FIG. 6 depicts an example in which network entity 340, at 624, sends positioning information (based on the positing operation at 414) to SnMF 133 and, at 626, sends sensing information (based on the sensing operation at 416) to LMF 131. In some implementations, network entity 340 may send sensing information to SnMF 133 before network entity 340 sends positioning information to SnMF 133.

It is noted that, during session establishment at 402 of FIG. 6, it may be established, by information exchange between LMF 131 and SnMF 133, that SnMF 133 includes functionality to itself receive and process the positioning information to generate the modified positioning information. At 628, SnMF 133 may generate modified positioning information based on the positioning information and based on the sensing information. Additionally, at 628, SnMF 133 may send the modified positioning information to LMF 131. Additionally, or alternatively, in some implementations, SnMF 133 may simply send the sensing information, the positioning information, or both to LMF 131, which may then perform position estimation 450 based on the sensing information and the positioning information.

LMF 131 may determine a position of an object, such as object 120, based on the modified positioning information. In this manner, LMF 131 may engage in less intensive processing to generate the position estimation of the object, thereby conserving processing functionality, memory functionality, or both of LMF 131.

Figure 7:
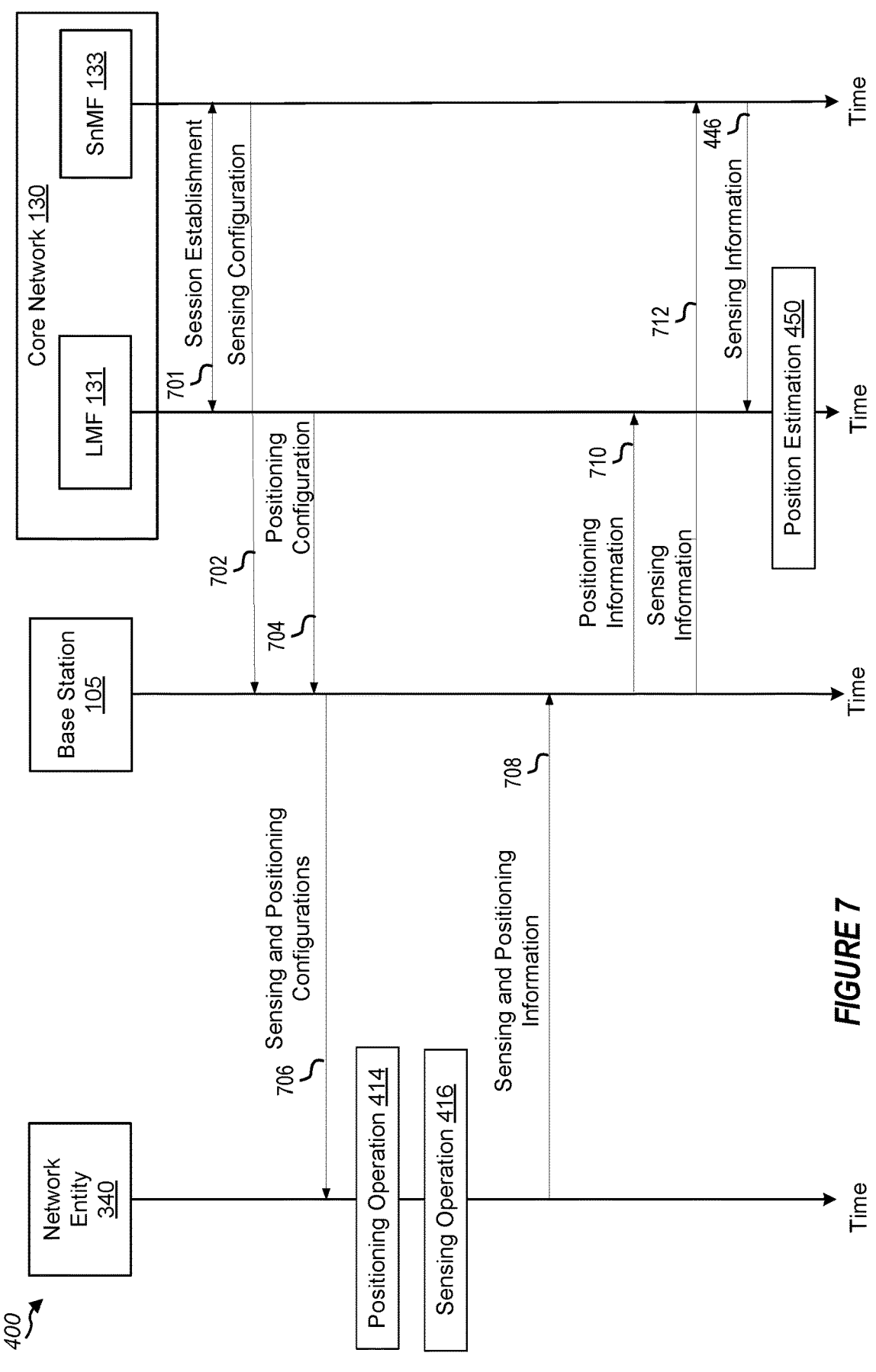
FIG. 7 is a ladder diagram illustrating an example of sensing assisted positioning according to one or more aspects.

FIG. 7 is a ladder diagram illustrating an example of sensing assisted positioning according to one or more aspects. In the example depicted in FIG. 7, at 701, during session establishment, core network 130 may, in addition to the functionality described with reference to FIGS. 4-6 at 402, identify a base station 105 configured to receive a configuration, such as a positioning configuration, a sensing configuration, or both.

At 702, SnMF 133 may send a sensing configuration to base station 105. Additionally, at 704, LMF 131 may send a positioning configuration to base station 105. While FIG. 7 depicts that sensing configuration is sent prior to positioning configuration, in implementations, the configurations may be sent concurrently. Alternatively, the positioning configuration may be sent to base station 105 prior to the sensing configuration. In some implementations, LMF 131 or SnMF 133 may send both the sensing configuration and the positioning configuration to base station 105. The positioning configuration may include or correspond to positioning configuration 348. Additionally, or alternatively, sensing configuration may include or correspond to sensing configuration 350.

At 706, base station 105 may send the sensing and positioning configurations to network entity 340. Alternatively, base station 105 may send each of the sensing and positioning configurations to network entity 340 at different times—e.g., in separate messages.

At 708, network entity 340 may send sensing and positioning information to base station 105. The sensing information may include or correspond to sensing information 314 or sensing report 360. The positioning information may include or correspond to positioning information 312 or positioning report 358. Alternatively, network entity 340 may send each of the sensing information and the positioning information to base station 105 at different times.

At 710, base station 105 may send the positioning information to LMF 131. Additionally, at 712, base station 105 may send the sensing information to SnMF 133. Alternatively, base station 105 may send the positioning information to LMF 131 at a same time at which base station 105 sends the sensing information to SnMF 133. In other implementations, base station 105 may send the sensing information to SnMF 133 before base station 105 sends the positioning information to LMF 131.

Figure 8:
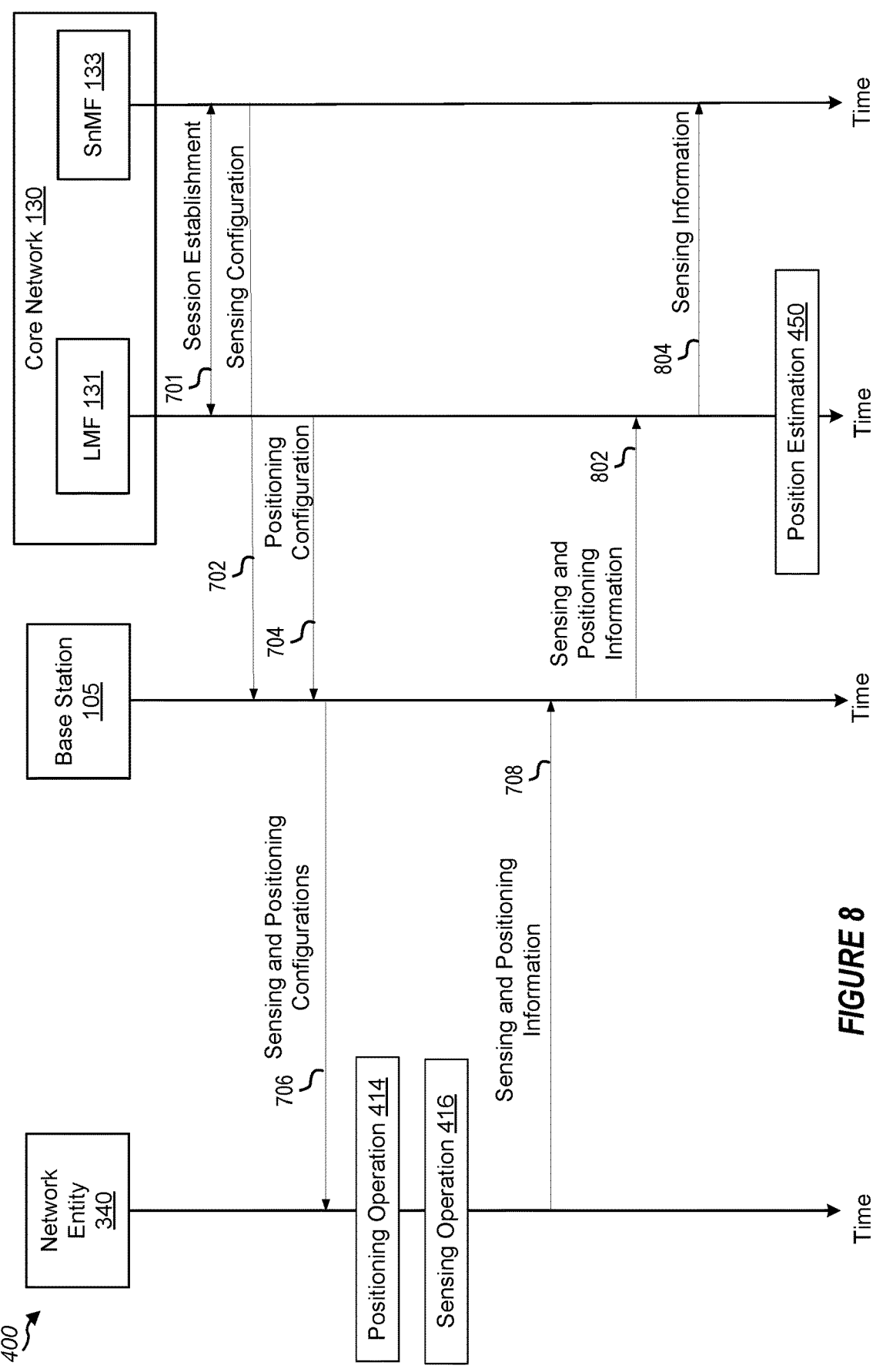
FIG. 8 is a ladder diagram illustrating an example of sensing assisted positioning according to one or more aspects.

FIG. 8 is a ladder diagram illustrating an example of sensing assisted positioning according to one or more aspects. In the example depicted in FIG. 8 and at 802, base station 105 may send sensing information and positioning information to LMF 131. For example, base station 105 may send sensing information and positioning information concurrently to LMF 131. In other implementations, base station 105 may send sensing information at a first time and position information at a second time that may be prior to or after the first time. At 804, LMF 131 may send sensing information to SnMF 133.

Figure 9:
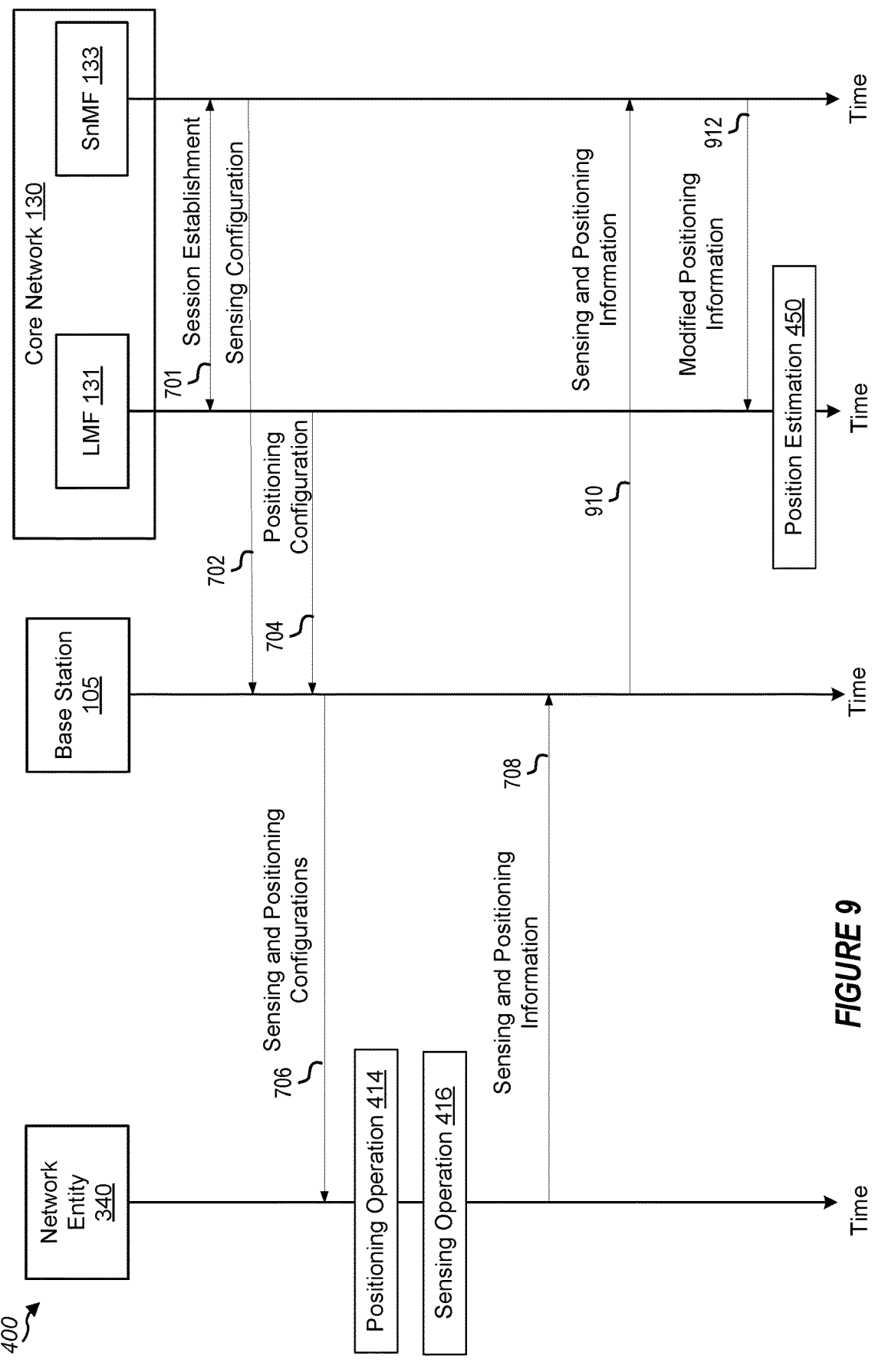
FIG. 9 is a ladder diagram illustrating an example of sensing assisted positioning according to one or more aspects.

FIG. 9 is a ladder diagram illustrating an example of sensing assisted positioning according to one or more aspects. In the example depicted in FIG. 9, at 910, base station 105 may send the sensing and position information to SnMF 133. For instance, base station 105 may send the sensing and position information to SnMF 133 concurrently or each in separate messages. At 912, SnMF 133 may generate modified positioning information based on the sensing information and based on the positioning information. The modified positioning information may provide an indication of a position of an object, such as object 120, that is more accurate, more precise, or both than if a position determination were to be based solely on positioning information. Additionally, in some implementations, SnMF 133 may also send the sensing and positioning information to LMF 131.

Figure 10:
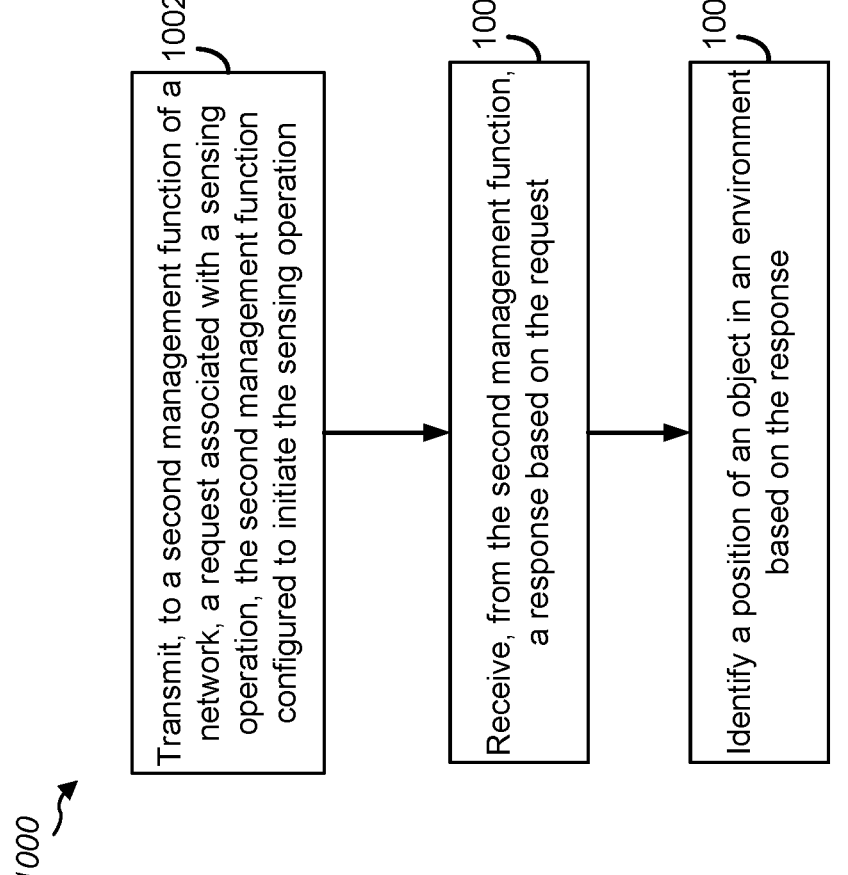
FIG. 10 is a flow diagram illustrating an example process that supports sensing assisted positioning according to one or more aspects.

FIG. 10 is a flow diagram illustrating an example process 1000 that supports sensing assisted positioning according to one or more aspects. Operations of process 1000 may be performed by a core network, such as core network 130 described above with reference to FIGS. 1-9 or a core network described with reference to FIG. 11. To illustrate, operations of process 1000 may be performed by a first management function of a core network, a second management function of the core network, or both. In some implementations, the first management function may include or correspond to an LMF, such as LMF 131 of FIGS. 1-9, while the second management function may include or correspond to an SnMF, such as SnMF 133 of FIGS. 1-9. For instance, example operations (also referred to as "blocks") of process 1000 may enable core network 130, including LMF 131 and SnMF 133, to support sensing assisted positioning.

In block 1002, a first management function of a network (e.g., a core network) transmits, to a second management function of the network, a request associated with a sensing operation. The second management function may be configured to initiate the sensing operation. For example, the network may include or correspond to core network 130, the first management function may include or correspond to LMF 131, and the second management function may include or correspond to SnMF 133. The request associated with the sensing operation may include or correspond to request 342.

In block 1004, the first management function receives, from the second management function, a response based on the request. For example, the response based on the request may include or correspond to response 344.

In block 1006, the first management function identifies a position of an object in an environment based on the response. For instance, LMF 131 may identify a position of object 120 in an environment based on response 344. To identify the position of the object, the first management function may determine or calculate the position, or update a previous position. The environment may include or correspond to any space in which one or more objects, such as object 120, may be located.

In some implementations, the first management function may update an initial estimate of the position of the object based on the response. In some implementations, prior to transmitting a request, such as request 342, the first management function (e.g., LMF 131) may receive, from the second management function (e.g., SNMF 133), an initial estimate of the position of the object. Additionally or alternatively, the first management function, such as LMF 131, may itself generate an initial estimate of the position of object 120. The initial estimate of the position of the object may include or correspond to an initial hypothesis of guess as to a location of the object in the environment. For example, the initial estimate of the position of the object may include or correspond to coordinates of the object's position in a three dimensional coordinate system.

In some implementations, updating the initial estimate of the position of the object, by the first management function, such as LMF 131, based on the response, such as based on response 344, includes transmitting, by the first management function (e.g., LMF 131), multiple requests associated with the sensing operation. The multiple requests may include request 342. Additionally, the first management function (e.g., LMF 131) may receive multiple responses based on the multiple requests. The multiple responses may include response 344. Each response of the multiple responses may be based on a different request of the multiple requests. The first management function, such as LMF 131, may identify the position of the object, such as object 120, based on the multiple responses. It is understood that request 342 may include or correspond to the foregoing multiple requests and that response 344 may include or correspond to the foregoing multiple responses.

In some implementations, identifying, by the first management function (e.g., LMF 131), the position of the object (e.g., object 120) includes determining, by the first management function, an estimated position of the object based on an initial response of the foregoing multiple responses. The first management function (e.g., LMF 131) may iteratively update the estimated position for reach received subsequent response of the multiple responses. By iteratively updating the estimated position for reach received subsequent response of the multiple responses, the first management function (e.g., LMF 131) may be configured to improve an accuracy, a precision, or both with which a location of an object in an environment is identified. To elaborate, by collecting more data indicative of a position of the object, the first management function (e.g., LMF 131) may be configured to improve upon an initial estimate of the location of the object, thereby enhancing an accuracy, a precision, or both of the estimated location of the object.

In some implementations, the request, such as request 342 (or the one or more multiple requests) indicate an expected sensing result. The expected sensing result may include a distance measurement that indicates a distance between one or more network entities, such as network entity 340, configured to perform the sensing operation and the object, such as object 120. Additionally, the expensed sensing result may include an angle measurement that indicates a beam angle associated with the sensing operation and the object. The beam angle may correspond to an angle of one or more beams of sensing signal 354. Moreover, the expensed sensing result may include a velocity measurement that indicates a velocity of the object relative to the one or more network entities configured to perform the sensing operation. For example, network entity 340 may be configured to determine a velocity of object 120 based on sensing signal 354 and the reflected sensing signal, reflected off of a surface of object 120. The sensing operation may include or correspond to the sensing operation described with reference to FIG. 3.

In some implementations, the request, such as request 342, may include a first indicator that indicates an area within the environment in which the sensing operation is to be performed. For instance, the first management function (e.g., LMF 131) may indicate, via request 342, to the second management function (e.g., SnMF 133) a region, an area, or a space within an environment in which sensing operations are to be performed, such as by one or more network entities (e.g., network entity 340). Additionally, request 342 may include a second indicator that indicates an identity of one or more network entities, such as network entity 340, to be configured to perform the sensing operation. For example, an identity of the one or more network entities may include or correspond to an identification code assigned to the one or more network entities, an address (e.g., an Internet address) of the one or more network entities, or any combination thereof. Further, request 342 may include a third indicator that indicates an expected sensing result. The expected sensing result may include or correspond to any of the examples discussed above.

In some implementations, the one or more network entities, such as network entity 340, include a transmission reception point (TRP), a user equipment (UE) (e.g., UE 115), or a combination thereof. Additionally, the one or more network entities may include a base station, such as base station 105.

In some implementations, the response, such as response 344, includes object information that indicates multiple objects, such as object 120, within an area of the environment. For example, the object information may indicate a presence of multiple objects, in addition to object 120, within an area of an environment in which a sensing operation has been performed. Further, response 344 may include an indication of the area indicated by request 342. For instance, response 344 may indicate which area or areas of an environment are to be surveyed by a sensing operation. Moreover, response 344 may include measurement information associated with a characteristic of the object, such as object 120. The measurement information may indicate a size of the object, dimensions (e.g., in a three dimensional coordinate system) or the object, or any combination thereof.

FIG. 11 is a flow diagram illustrating an example process 1000 that supports sensing assisted positioning according to one or more aspects. Operations of process 1100 may be performed by a network (e.g., a core network), such as core network 130 described above with reference to FIGS. 1-9 or a core network described with reference to FIG. 12. For instance, example operations (also referred to as "blocks") of process 1100 may enable core network 130 to support sensing assisted positioning.

In block 1102, the network establishes a joint positioning and sensing session between a first management function of the network (e.g., a core network) and a second management function of the network. For example, the first management function may include or correspond to LMF 131 and the second management function may include or correspond to SnMF 133 of core network 130.

In block 1104, the network transmits a first configuration associated with a sensing operation. For example, the second management function, such as SnMF 133, may send or transmit the first configuration, which may include or correspond to sensing configuration 350.

In block 1106, the network transits a second configuration associated with a positioning operation. For example, the first management function, such as LMF 131, may send or transmit the second configuration, which may include or correspond to positioning configuration 348.

In block 1108, the network receives a sensing report that indicates a characteristic of an object within an environment. The characteristic may be determined based on the sensing operation. For example, LMF 131 may receive sensing report 360, and sensing report 360 may indicate a characteristic of object 120. The characteristic may include or correspond to a property of object 120, such as a distance separating object 120 from the network entity (e.g., network entity 340) that performed the sensing operation. In other examples, SnMF 133 may receive sensing report 360, and SNMF 133 may send sensing report 360 to LMF 131.

In block 1110, the network receives a positioning report, such as positioning report 358. For example, LMF 131 may receive positioning report 358, and positioning report 358 may include positioning information 312. In other examples, SnMF 133 may receive positioning report 358, and SnMF 133 may send positioning report 358 to LMF 131.

In block 1112, the network may identify a position of the object within the environment based on the positioning report and based on the characteristic indicated by the sensing report. For example, LMF 131 may identify the position of object 120 within an environment, such as any space, based on positioning report 358 and based on one or more characteristics of object 121 indicated by sensing report 360.

In some implementations, identifying the position of the object, by the network, includes determining, by the first management function, the position of the object based on a positioning measurement indicated by the positioning report and based on a sensing measurement indicated by the sensing report. For example, LMF 131 may identify the position of the object based on positioning information 312 included in positioning report 356. Positioning information 312 may include the positioning measurement. Additionally, LMF 131 may identify the position of the object based on sensing information 314 included in sensing report 360. Sensing information 314 may include the sensing measurement. In some implementations, the sensing measurement is associated with a distance from a network entity to the object, an angle measurement indicating an angle formed by a beam transmitted during the sensing operation and the object, a velocity of the object, or a combination thereof.

In some implementations, establishing, by the network, the joint positioning and sensing session includes performing, by the first management function, operations that include sending, to the second management function, capability information that indicates a capability of the first management function. For example, LMF 131 may send, to SnMF 133, capability information that indicates a capability of LMF 131. A capability of LMF 131 may identify functionalities of LMF 131, such as whether LMF 131 is capable of processing sensing information, such as sensing information 314. Additionally, the operations may include identifying one or more network entities, configurable by the second management function, to perform the sensing operation. For example, LMF 131 may identify, to SnMF 133, network entity 340 or other network entities capable of performing a sensing operation. Further, the operations may include providing, to the second management function, a first indication of measurement types to be generated by the sensing operation. For instance, LMF 131 may provide, to SnMF 133, an indication of measurement types, such as distance measurements, angle measurements, velocity measurements, and the like, that are to be generated by the sensing operation. Moreover, the operations may include providing, to the second management function, a second indication of reference signal resources operable to perform positioning measurements. For instance, LMF 131 may provide, to SnMF 133, an indication of resource blocks (RBs) available to perform positioning measurements.

In some implementations, establishing the joint positioning and sensing session includes performing, by the second management function, operations that include sending, to the first management function, capability information that indicates a capability of the second management function. For example, SnMF 133 may send capability information to LMF 131 that indicates a capability of SnMF 133. A capability of SnMF 133 may identify functionalities of SnMF 133, such as whether SnMF 133 is capable of processing positioning information, such as positioning information 312. Additionally, the operations may include identifying one or more network entities, configurable by the first management function, to perform the sensing operation. For example, SnMF 133 may identify, to LMF 131, network entity 340 or other network entities capable of performing a positioning operation. Moreover, the operations include providing, to the first management function, a first indication of reference signal resources operable to perform sensing measurements. For example, SnMF 133 may provide, to LMF 131, an indication of resource blocks (RBs) available to perform sensing measurements.

In some implementations, transmitting, by the network entity, the first configuration includes transmitting the first configuration to a first set of network entities. For example. SnMF 133 may be configured to transmit sensing configuration 350 to a first set of network entities, such as network entity 340. The first set of network entities may include TRPs, base stations (e.g., base station 105), UEs (e.g., UE 115), or any combination thereof.

In some implementations, transmitting the second configuration includes transmitting the second configuration to a second set of network entities. For example, LMF 131 may be configured to transmit positioning configuration 348 to a second set of network entities, such as network entity 340. The second set of network entities may include TRPs, base stations (e.g., base station 105), UEs (e.g., UE 115), or any combination thereof.

In some implementations, at least one network entity is included in the first set of network entities and in the second set of network entities. For example, network entity 340 may be included in both the first set and the second set.

In some implementations, at least one of the first set of network entities includes a base station, and at least one of the second set of network entities may include a TRP. In other implementations, at least one of the first set of network entities includes a TRP, and at least one of the second set of network entities includes a UE.

In some implementations, the first management function includes an LMF. For instance, the first management function may include or correspond to LMF 131. The second management function may include a SnMF. For example, the second management function may include or correspond to SnMF 133.

In some implementations, receiving, by the network, the positioning report includes receiving the positioning report at the first management function. For example, LMF 131 may be configured to receive positioning report 358. In some implementations, receiving the sensing report includes receiving the sensing report at the second management function. As an example, SnMF 133 may be configured to receive sensing report 360.

In some implementations, the second management function transmits the sensing report to the first management function. For example, SnMF 133 may be configured to transmit or send sensing report 360 to LMF 131.

In some implementations, transmitting the first configuration includes transmitting, by the network, the first configuration to a base station. For example, LMF 131 may be configured to transmit positioning configuration 348 to a base station, such as base station 105. Subsequently, the base station may be configured to transmit positioning configuration 348 to one or more network entities, such as network entity 340.

In some implementations, transmitting, by the network, the second configuration includes transmitting the second configuration to the base station. The base station may be configured to transmit the first configuration and the second configuration to a network entity served by the base station. For instance, SnMF 133 may be configured to transmit sensing configuration 360 to one or more base stations. The one or more base stations may be configured to transmit the sensing configuration 350 to one or more network entities, such as network entity 340.

Figure 12:
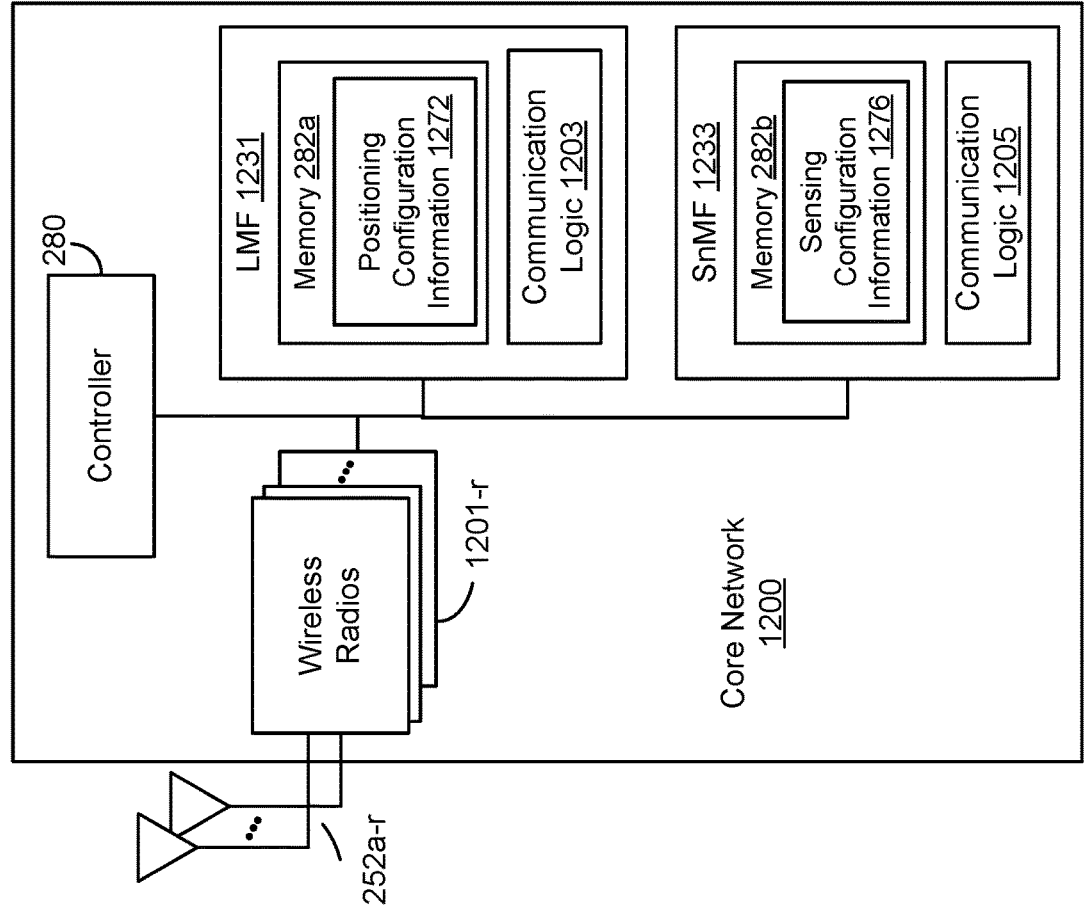
FIG. 12 is a block diagram of an example core network that supports sensing assisted positioning according to one or more aspects.

FIG. 12 is a block diagram of an example core network 1200 that supports sensing assisted positioning according to one or more aspects. Core network 1200 may be configured to perform operations, including the blocks of a process described with reference to FIGS. 10-11. In some implementations, core network 1200 includes the structure, hardware, and components shown and described with reference to core network 130 of FIGS. 1-9. For example, core network 1200 includes controller 280, which operates to execute logic or computer instructions stored in memory 282a, 282b as well as controlling the components of core network 1200 that provide the features and functionality of core network 1200, as a non-limiting illustrative example. Core network 1200, under control of controller 280, transmits and receives signals via wireless radios 1201a-r and antennas 252a-r. Wireless radios 1201a-r include various components and hardware, as illustrated in FIG. 2, including modulator and demodulators 254a-r, MIMO detector 256, receive processor 258, transmit processor 264, and TX MIMO processor 266. Additionally or alternatively, core network 1200 may include or correspond to one or more servers linked via wired communication, wireless communication, or both.

Core network 1200 includes LMF 1231 and SnMF 1233. LMF 1231 may include or correspond to LMF 131 as shown in FIGS. 1 and 3-9. SnMF 1233 may include or correspond to SnMF 133 as shown in FIGS. 1 and 3-9.

LMF 1231 may include memory 282a and communication logic 1203. Memory 282a may include positioning configuration information 1272, which may include or correspond to positioning configuration information 372. Communication logic 1203 may be configured to enable communication between LMF 1231 and one or more other devices, such one or more network entities (e.g., network entity 340). LMF 1231 may receive signals from or transmit signals to one or more network entities.

SnMF 1233 may include memory 282b and communication logic 1205. Memory 282b may include sensing configuration information 1276, which may include or correspond to sensing configuration information 376. Communication logic 1205 may be configured to enable communication between SnMF 1233 and one or more other devices, such one or more network entities (e.g., network entity 340). SnMF 1233 may receive signals from or transmit signals to one or more network entities.

Figures 13, 14:
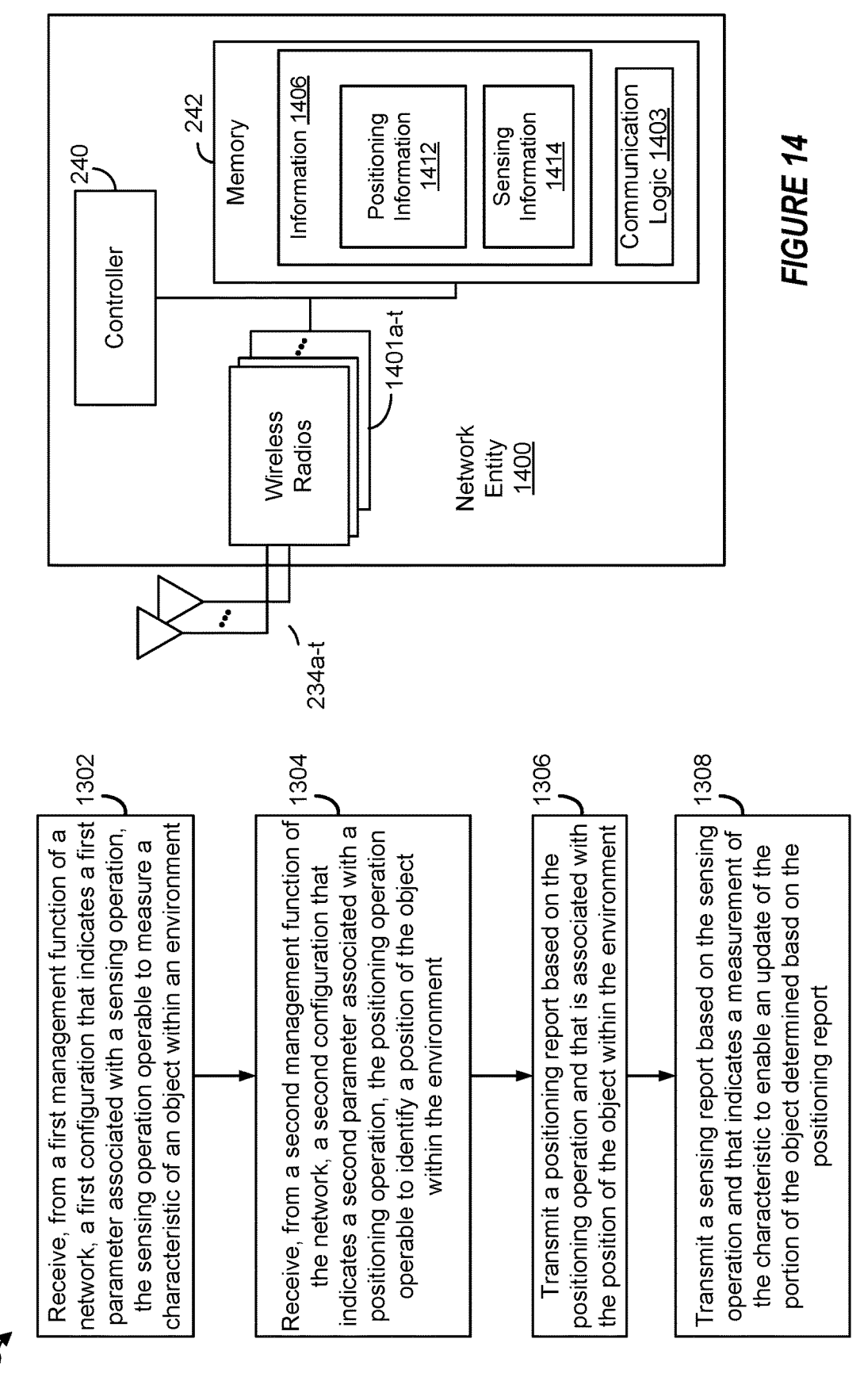
FIG. 13 is a flow diagram illustrating an example process that supports sensing assisted positioning according to one or more aspects.
FIG. 14 is a block diagram of an example network entity that supports sensing assisted positioning according to one or more aspects.

FIG. 13 is a flow diagram illustrating an example process 1300 that supports sensing assisted positioning according to one or more aspects. Operations of process 1300 may be performed by a network entity, such as network entity 340 described above with reference to FIGS. 1-9 or a network entity described with reference to FIG. 14. For instance, example operations (also referred to as "blocks") of process 1300 may enable network entity 340 to support sensing assisted positioning.

In block 1302, a network entity receives, from a first management function of a network, a first configuration that indicates a first parameter associated with a sensing operation. The sensing operation is operable to measure a characteristic of an object within an environment. For example, the network entity may include or correspond to network entity 340, and the first management function may include or correspond to SnMF 133 of core network 130. The first configuration may include or correspond to sensing configuration 350. The sensing operation may include or correspond to the sensing operation described with reference to FIG. 3.

In block 1304, the network entity receives, from a second management function of the network, a second configuration that indicates a second parameter associated with a positioning operation. The positioning operation is operable to identify a position of the object within the environment. For example, the second management function may include or correspond to LMF 131 of core network 130 and the second configuration may include or correspond to sensing configuration 350. The positioning operation may include or correspond to the positioning operation described with reference to FIG. 3.

In block 1306, the network entity may transmit a positioning report based on the positioning operation and that is associated with the position of the object within the environment. The positioning report may include or correspond to positioning report 358. Additionally, the positioning report may include positioning information 312 generated based on performance, by network entity 340, of the positioning operation.

In block 1308, the network entity may transmit a sensing report based on the sensing operation and that indicates a measurement of the characteristic to enable an update of the position of the object determined based on the positioning report. The sensing report may include or correspond to sensing report 360. Additionally, the sensing report may include sensing information 314 generated based on performance, by network entity 340, of the sensing operation.

In some implementations, a management function, such as LMF 131, that receives the positioning report and the sensing report may be configured to identify a position of the object based on the positioning information and the sensing information. To illustrate, by combining the sensing information and the positioning information, a more accurate or a more precise determination of a position of an object may be possible than with solely positioning information or sensing information.

In some implementations, the first parameter indicates a sensing measurement, and the measurements (e.g., the sensing measurements) indicate a characteristic of an object, such as object 120. For example, the characteristic may include a distance between the network entity, such as network entity 340, and the object, such as object 120, an angle measurement indicating an angle formed by a beam transmitted during the sensing operation and the object, a velocity of the object, or a combination thereof. An angle formed by a beam transmitted during the sensing operation and the object may include or correspond to an angle formed by one or more beams of sensing signal 354. For instance, a plurality of antennas of transmitter 316 may be configured to generate a beam of sensing signal 354, each of which travels through spacetime in a different direction. The angle formed by a beam and an object against which the beam may impinge may correspond to the angle measurement. In some implementations, the characteristic may include a radar cross section of one or more objects present in the environment, from which a determination of a volume and a shape of the one or more objects may be made.

In some implementations, the first parameter further indicates an output of the sensing operation. The output may include a Doppler map, a point cloud, objects identified as a result of the sensing operation, or a combination thereof. The objects may be positioned in the environment and may include the object 120. The Doppler map may include or correspond to a map of objects in the environment. By reflecting or partially reflecting the sensing signal 354, network entity 340 may be configured to generate a map of objects in the environment based on the reflected or partially reflected sensing signal.

In some implementations, the network entity, such as network entity 340, may generate a PRS, such as PRS 352, based on the second parameter. For instance, the second parameter may include a first value corresponding to a frequency, a second value corresponding to an amplitude, a third value corresponding to a phase, a fourth value corresponding to modulation data, or combinations thereof. Based on any one or more of the foregoing, network entity 340 may be configured to generate PRS 352. Additionally, network entity 340 may be configured to transmit PRS 352. For instance, one or more antennas may of transmitter 316 may be configured to generate multidirectional beams of PRS 352. Further, network entity 340 may be configured to generate a positioning report, such as positioning report 358, based on a reflected PRS. In particular, the transmitted PRS 352 may be reflected or partially reflected off of a surface of an object in the environment. The network entity 340 may be configured to generate the positioning report based on the transmitted PRS 352 and reflected PRS by, for example, calculating a round trip time (RTT) of the transmitted and reflected PRS.

In some implementations, the network entity, such as network entity 340, may be configured to generate a sensing signal based on the first parameter. For instance, the first parameter may include a first value corresponding to a frequency, a second value corresponding to an amplitude, a third value corresponding to a phase, a fourth value corresponding to modulation data, or combinations thereof. Based on any one or more of the foregoing, network entity 340 may be configured to generate sensing signal 354. Sensing signal 354 may include or correspond to a RF signal. Additionally or alternatively, sensing signal 354 may include or correspond to a microwave signal, an infrared (IR) signal, or any electromagnetic signal.

In some implementations, the network entity, such as network entity 340, may transmit the sensing report, such as sensing report 360, to the first management function (e.g., SnMF 133), to the second management function (e.g., LMF 131), or both. Additionally, in some implementations, network entity 340 may transmit the positioning report, such as positioning report 358, to the first management function, to the second management function, or both. FIGS. 4-9 provide additional detail regarding different ways in which a network entity may send or transmit the sensing report, the positioning report, or both to components of a core network.

In some implementations, the network entity, such as network entity 340, may transmit the sensing report, such as sensing report 360, to the first management function (e.g., SnMF 133). Additionally, network entity 340 may transmit positioning report 358 to the second management function (e.g., LMF 131). The second management function may be configured to receive the sensing repot from the first management function. Additionally, the second management function may be configured to identify the position of the object, such as object 120, based on the positioning report and the sensing report. By combining sensing information 314 included in sensing report 360 and positioning information 312 included in positioning report 358, LMF 131 may be configured to generate a more accurate and/or a more precise position of the object than if LMF 131 only used positioning information or sensing information to identify a position of the object.

FIG. 14 is a block diagram of an example network entity 1400 that supports sensing assisted positioning according to one or more aspects. Network entity 1400 may be configured to perform operations, including the blocks of process 1300 described with reference to FIG. 13. In some implementations, network entity 1300 includes the structure, hardware, and components shown and described with reference to network entity 340 of FIGS. 1-9. It is understood that network entity 1300 may be a UE, such as UE 115, a base station, such as base station 105, a TRP, or any of the foregoing. Accordingly, network entity 1300 may include any of the components of UE 115, base station 105, or both described with reference to FIGS. 1 and 2. For example, network entity 1400 may include controller 240, which operates to execute logic or computer instructions stored in memory 242, as well as controlling the components of network entity 1400 that provide the features and functionality of network entity 1400. Network entity 1400, under control of controller 240, transmits and receives signals via wireless radios 1401*a-t* and antennas 234*a-t*. Wireless radios 1401*a-t* include various components and hardware, as illustrated in FIG. 2, including modulator and demodulators 232*a-t*, transmit processor 220, TX MIMO processor 230, MIMO detector 236, and receive processor 238.

As shown, memory 242 may include information 1406 and communication logic 1403. Additionally, information 1406 may include positioning information 1412 and sensing information 1414. Information 1406, positioning information 1412, and sensing information 1414 may include or correspond to measurement information 310, positioning information 312, and sensing information 314, respectively. Communication logic 1403 may be configured to enable communication between network entity 1400 and one or more other devices. Network entity 1400 may receive signals from or transmit signals to a core network, such as core network 130 of FIG. 1 or 4-9 or core network 1200 of FIG. 12.

It is noted that one or more blocks (or operations) described with reference to FIGS. 10, 11, and 13 may be combined with one or more blocks (or operations) described with reference to another of the figures. For example, one or more blocks (or operations) of FIG. 10 may be combined with one or more blocks (or operations) of FIG. 11. As another example, one or more blocks associated with FIG. 11 may be combined with one or more blocks associated with FIG. 13. As another example, one or more blocks associated with FIGS. 10, 11, and 13 may be combined with one or more blocks (or operations) associated with FIGS. 1-9. Additionally, or alternatively, one or more operations described above with reference to FIGS. 1-9 may be combined with one or more operations described with reference to FIG. 12 or 14.

In one or more aspects, techniques for supporting sensing assisted positioning may include additional aspects, such as any single aspect or any combination of aspects described below or in connection with one or more other processes or devices described elsewhere herein. In a first aspect, techniques for supporting sensing assisted positioning may include transmitting, to a second management function of the network, a request associated with a sensing operation. The second management function is configured to initiate the sensing operation. The techniques may further include receiving, from the second management function, a response based on the request; and identifying a position of an object in an environment based on the response. In some examples, the techniques in the first aspect may be implemented in a method or process. In some other examples, the techniques of the first aspect may be implemented in a communication device, which may include a management function or a component of a management function, a core network or a component of a core network, or a server or a component of a server. For example, the techniques may include or correspond to a method or process, sch as a method to support one or more positioning operations performed by a first management function of a network. In some examples, the communication device may include at least one processing unit or system (which may include an application processor, a modem or other components) and at least one memory device coupled to the processing unit. The processing unit may be configured to perform operations described herein with respect to the communication device. In some examples, the memory device includes a non-transitory computer-readable medium having program code stored thereon that, when executed by the processing unit, is configured to cause the communication device to perform the operations described herein. Additionally, or alternatively, the communication device may include an interface (e.g., a communication interface) that includes a transmitter, a receiver, or a combination thereof. Additionally, or alternatively, the communication device may include one or more means configured to perform operations described herein.

In a second aspect, in combination with the first aspect, the techniques further include identifying the position of the object includes calculating or determining the position based on the response.

In a third aspect, in combination with the first aspect or the second aspect, the techniques further include updating an initial estimate of the position of the object based on the response.

In a fourth aspect, in combination with the first aspect or the second aspect, the techniques further include, prior to transmitting the request, receiving, from the second management function, an initial estimate of the position of the object.

In a fifth aspect in combination with the first aspect or the second aspect, the techniques further include, prior to transmitting the request, generating an initial estimate of the position of the object.

In a sixth aspect, in combination with the first aspect or the second aspect, to update the initial estimate of the position of the object based on the response, the techniques include transmitting multiple requests associated with the sensing operation, the multiple requests in addition to the request.

In a seventh aspect, in combination with the sixth aspect, to update the initial estimate of the position of the object based on the response, the techniques include receiving multiple responses based on the multiple requests, each response of the multiple responses based on a different request of the multiple requests.

In an eighth aspect, in combination with the seventh aspect, to update the initial estimate of the position of the object based on the response, the techniques further include identifying the position of the object based on the multiple responses.

In a ninth aspect, in combination with the eighth aspect, to identify the position, the techniques include determining an estimated position based on an initial response of the multiple responses.

In a tenth aspect, in combination with the ninth aspect, to identify the position, the techniques include iteratively updating the estimated position for each received subsequent response of the multiple responses.

In an eleventh aspect, in combination with one or more of the first aspect through the tenth aspect, the request indicates an expected sensing result.

In a twelfth aspect, in combination with the eleventh aspect, the expected sensing result includes a distance measurement that indicates a distance between one or more network entities configured to perform the sensing operation and the object.

In a thirteenth aspect, in combination with the eleventh aspect or the twelfth aspect, the expected sensing result includes an angle measurement that indicates a beam angle associated with the sensing operation and the object.

In a fourteenth aspect, in combination with one or more of the eleventh aspect through the thirteenth aspect, the expected sensing result includes a velocity measurement that indicates a velocity of the object relative to the one or more network entities configured to perform the sensing operation.

In a fifteenth aspect, in combination with one or more of the eleventh aspect through the fourteenth aspect, the expected sensing result includes a range associated with the object.

In a sixteenth aspect, in combination with one or more of the first aspect through the fifteenth aspect, the request includes a first indicator that indicates an area within the environment in which the sensing operation is to be performed.

In a seventeenth aspect, in combination with one or more of the first aspect through the sixteenth aspect, the request includes a second indicator that indicates an identity of one or more network entities to be configured to perform the sensing operation.

In an eighteenth aspect, in combination with one or more of the first aspect through the seventeenth aspect, the request includes a third indicator that indicates an expected sensing result.

In a nineteenth aspect, in combination with one or more of the sixteenth aspect through the eighteenth aspect, the one or more network entities include a TRP, a UE, or a combination thereof.

In a twentieth aspect, in combination with one or more of the sixteenth aspect through the nineteenth aspect, the first management function includes an LMF.

In a twenty-first aspect, in combination with one or more of the sixteenth aspect through the twentieth aspect, the second management function includes an SnMF.

In a twenty-second aspect, in combination with one or more of the first aspect through the twenty-first aspect, the response includes object information that indicates multiple objects within an area of the environment, the multiple objects including the object, an indication of the area indicated by the request, measurement information associated with a characteristic of the object, or a combination thereof.

In one or more aspects, techniques for supporting sensing assisted positioning may include additional aspects, such as any single aspect or any combination of aspects described below or in connection with one or more other processes or devices described elsewhere herein. In a twenty-third aspect, techniques for supporting sensing assisted positioning may include receiving, from a first management function of a network, a first configuration that indicates a first parameter associated with a sensing operation. The sensing operation is operable to measure a characteristic of an object within an environment. The techniques may further include receiving, from a second management function of the network, a second configuration that indicates a second parameter associated with a positioning operation. The positioning operation is associated with a determination of a position of the object within the environment. The techniques may also include transmitting a positioning report based on the positioning operation and that is associated with the position of the object within the environment; and transmitting a sensing report based on the sensing operation and that indicates a measurement of the characteristic to enable an update of the position of the object determined based on the positioning report. In some examples, the techniques in the twenty-third aspect may be implemented in a method or process, such as a method to support one or more positioning operations performed by a network entity. In some other examples, the techniques of the twenty-third aspect may be implemented in a wireless communication device, such as network entity, which may include a UE or a component of a UE, a TRP or a component of a TRP, or a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a twenty-fourth aspect, in combination with the twenty-third aspect, the first management function corresponds to an SnMF.

In a twenty-fifth aspect, in combination with the twenty-third aspect or the twenty-fourth aspect, the second management function corresponds to an LMF.

In a twenty-sixth aspect, in combination with one or more of the twenty-third aspect through the twenty-fifth aspect, the first parameter indicates a sensing measurement.

In a twenty-seventh aspect, in combination with one or more of the twenty-third aspect through the twenty-sixth aspect, the characteristic includes a distance between the network entity and the object.

In a twenty-eighth aspect, in combination with one or more of the twenty-third aspect through the twenty-seventh aspect, the characteristic includes an angle measurement indicating an angle formed by a beam transmitted during the sensing operation and the object.

In a twenty-ninth aspect, in combination with one or more of the twenty-third aspect through the twenty-eighth aspect, the characteristic includes a velocity of the object.

In a thirtieth aspect, in combination with one or more of the twenty-third aspect through the twenty-ninth aspect, the characteristic includes a range associated with the object.

In a thirty-first aspect, in combination with one or more of the twenty-third aspect through the thirtieth aspect, the first parameter further indicates an output of the sensing operation.

In a thirty-second aspect, in combination with the thirty-first aspect, the output includes a Doppler map, a range, an angle map, a point cloud, objects identified as a result of the sensing operation, the objects positioned in the environment and including the object, or a combination thereof.

In a thirty-third aspect, in combination with one or more of the twenty-third aspect through the thirty-second aspect, the techniques further include generating a PRS based on the second parameter.

In a thirty-fourth aspect, in combination with the thirty-third aspect, the techniques further include transmitting the PRS.

In a thirty-fifth aspect, in combination with the thirty-fourth aspect, the techniques further include generating the positioning report based on a reflected PRS, the reflected PRS reflected off of a surface of the object in response to transmission of the PRS.

In a thirty-sixth aspect, in combination with one or more of the twenty-third aspect through the thirty-fifth aspect, 14. The method of claim 9, further comprising the techniques further include generating a sensing signal based on the first parameter, wherein the sensing signal comprises a RF signal.

In a thirty-seventh aspect, in combination with one or more of the twenty-third aspect through the thirty-sixth aspect, the techniques further include transmitting the sensing report to the first management function, to the second management function, or both.

In a thirty-eighth aspect, in combination with one or more of the twenty-third aspect through the thirty-seventh aspect, the techniques further include transmitting the positioning report to the first management function, to the second management function, or both.

In a thirty-ninth aspect, in combination with one or more of the twenty-third aspect through the thirty-sixth aspect, the techniques further include transmitting the sensing report to the first management function.

In a fortieth aspect, in combination with the thirty-ninth aspect, the techniques further include transmitting the positioning report to the second management function.

In a forty-first aspect, in combination with the fortieth aspect, the second management function is configured to receive the sensing report from the first management function.

In a forty-second aspect, in combination with the forty-first aspect, the second management function is configured to identify the position of the object based on the positioning report and the sensing report.

In a forty-third aspect, in combination with one or more of the twenty-third aspect through the forty-second aspect, to identify the position of the object, the second management function is configured to calculate or determine the position based on the positioning report and the sensing report.

In one or more aspects, techniques for supporting sensing assisted positioning may include additional aspects, such as any single aspect or any combination of aspects described below or in connection with one or more other processes or devices described elsewhere herein. In a forty-fourth aspect, techniques for supporting sensing assisted positioning may include establishing, between a first management function of the network and a second management function of the network, a joint positioning and sensing session. The techniques may further include transmitting a first configuration associated with a sensing operation; and transmitting a second configuration associated with a positioning operation. The techniques may also include transmitting a second configuration associated with a positioning operation; and receiving a sensing report that indicates a characteristic of an object within an environment. The characteristic is determined based on the sensing operation. The techniques may include identifying a position of the object within the environment based on the positioning report and based on the characteristic indicated by the sensing report. In some examples, the techniques in the forty-fourth aspect may be implemented in a method or process, such as a method to support a positioning operation and a sensing operation performed by a network. In some other examples, the techniques of the forty-fourth aspect may be implemented in a communication device, such as network entity, which may include a core network or a component of a core network, or a server or a component of a server. In some examples, the communication device may include at least one processing unit or system (which may include an application processor, a modem or other components) and at least one memory device coupled to the processing unit. The processing unit may be configured to perform operations described herein with respect to the communication device. In some examples, the memory device includes a non-transitory computer-readable medium having program code stored thereon that, when executed by the processing unit, is configured to cause the communication device to perform the operations described herein. Additionally, or alternatively, the communication device may include an interface (e.g., a communication interface) that includes a transmitter, a receiver, or a combination thereof. Additionally, or alternatively, the communication device may include one or more means configured to perform operations described herein.

In a forty-fifth aspect, in combination with the forty-fourth aspect, the first management function includes an LMF.

In a forty-sixth aspect, in combination with the forty-fourth aspect or the forty-fifth aspect, to identify the position of the object, the techniques further include determining, by the first management function, the position of the object based on a positioning measurement indicated by the positioning report and based on a sensing measurement indicated by the sensing report.

In a forty-seventh aspect, in combination with the forty-sixth aspect, the sensing measurement is associated with a distance from a network entity to the object, a range associated with the object, an angle measurement indicating an angle formed by a beam transmitted during the sensing operation and the object, a velocity of the object, or a combination thereof.

In a forty-eighth aspect, in combination with one or more of the forty-fourth aspect through the forty-seventh aspect, to establish the joint positioning and sensing session, the techniques further include performing, by the first management function, operations that include sending, to the second management function, capability information that indicates a capability of the first management function.

In a forty-ninth aspect, in combination with the forty-eighth aspect, the operations further include identifying one or more network entities, configurable by the second management function, to perform the sensing operation.

In a fiftieth aspect, in combination with the forty-ninth aspect, the operations further include providing, to the second management function, a first indication of measurement types to be generated by the sensing operation.

In a fifty-first aspect, in combination with the fiftieth aspect, the operations further include providing, to the second management function, a second indication of reference signal resources operable to perform positioning measurements.

In a fifty-second aspect, in combination with one or more of the forty-fourth aspect through the fifty-first aspect, to establish the joint positioning and sensing session, the techniques further include performing, by the second management function, operations that include sending, to the first management function, capability information that indicates a capability of the second management function.

In a fifty-third aspect, in combination with the fifty-second aspect, the operations further include identifying one or more network entities, configurable by the first management function, to perform the positioning operation.

In a fifty-fourth aspect, in combination with the fifty-third aspect, the operations further include providing, to the first management function, a first indication of reference signal resources operable to perform sensing measurements.

In a fifty-fifth aspect, in combination with one or more of the forty-fourth aspect through the fifty-fourth aspect, to transmit the first configuration, the techniques further include transmitting the first configuration to a first set of network entities.

In a fifty-sixth aspect, in combination with the fifty-fifth aspect, the techniques further include transmitting the second configuration includes transmitting the second configuration to a second set of network entities.

In a fifty-seventh aspect, in combination with the fifty-fifth aspect, at least one network entity is included in the first set of network entities and in the second set of network entities.

In a fifty-eighth aspect, in combination with the fifty-fifth aspect, at least one of the first set of network entities includes a base station.

In a fifty-ninth aspect, in combination with the fifty-eighth aspect, at least one of the second set of network entities includes a TRP.

In a sixtieth aspect, in combination with the fifty-fifth aspect, at least one of the first set of network entities includes a TRP.

In a sixty-first aspect, in combination with the sixtieth aspect, at least one of the second set of network entities includes a UE.

In a sixty-second aspect, in combination with one or more of the forty-fourth aspect through the sixty-first aspect, the first management function includes an LMF.

In a sixty-third aspect, in combination with the sixty-second aspect, the second management functions includes an SnMF.

In a sixty-fourth aspect, in combination with the sixty-third aspect, to receive the positioning report, the techniques further include receiving the positioning report at the first management function.

In a sixty-fifth aspect, in combination with the sixty-fourth aspect, to receive the sensing report, the techniques further include receiving the sensing report at the second management function.

In a sixty-sixth aspect, in combination with the sixty-fifth aspect the techniques further include transmitting, by the second management function, the sensing report to the first management function.

In a sixty-seventh aspect, in combination with the sixty-third aspect, to receive the positioning report, the techniques further include receiving the positioning report at the first management function.

In a sixty-eighth aspect, in combination with the sixty-seventh aspect, to receive the sensing report, the techniques further include receiving the sensing report at the first management function.

In a sixty-ninth aspect, in combination with the sixty-eighth aspect, the techniques further include transmitting, by the first management function, the sensing report to the second management function.

In a seventieth aspect, in combination with one or more of the forty-fourth aspect through the sixty-ninth aspect, to transmit the first configuration, the techniques further include transmitting the first configuration to a base station.

In a seventy-first aspect, in combination with the seventieth aspect, to transmit the second configuration, the techniques further include transmitting the second configuration to the base station.

In a seventy-second aspect, in combination with the seventy-first aspect, the base station is configured to transmit the first configuration and the second configuration to a network entity served by the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method to support one or more positioning operations performed by a network entity, the method comprising:
receiving, from a first management function of a network, a first configuration that indicates a first parameter associated with a sensing operation, the sensing operation operable to measure a characteristic of an object within an environment;
receiving, from a second management function of the network, a second configuration that indicates a second parameter associated with a positioning operation, the positioning operation associated with a determination of a position of the object within the environment;
transmitting a positioning report based on the positioning operation and that is associated with the position of the object within the environment; and
transmitting a sensing report based on the sensing operation and that indicates a measurement of the characteristic to enable an update of the position of the object determined based on the positioning report.

2. The method of claim 1, wherein:
the first management function corresponds to a sensing management function (SnMF), and
the second management function corresponds to a location management function (LMF).

3. The method of claim 1, wherein:
the first parameter indicates a sensing measurement,
the characteristic includes:
a distance between the network entity and the object,
an angle measurement indicating an angle formed by a beam transmitted during the sensing operation and the object,
a velocity of the object, or
a combination thereof.

4. The method of claim 3, wherein:
the first parameter further indicates an output of the sensing operation, and
the output includes:
a Doppler map,
a range,
an angle map,
a point cloud,
objects identified as a result of the sensing operation, the objects positioned in the environment and including the object, or
a combination thereof.

5. The method of claim 1, further comprising:
generating a positioning reference signal (PRS) based on the second parameter;
transmitting the PRS; and
generating the positioning report based on a reflected PRS, the reflected PRS reflected off of a surface of the object in response to transmission of the PRS.

6. The method of claim 1, further comprising:
generating a sensing signal based on the first parameter, wherein the sensing signal comprises a radio frequency (RF) signal.

7. The method of claim 1, further comprising:
transmitting the sensing report to the first management function, to the second management function, or both; and
transmitting the positioning report to the first management function, to the second management function, or both.

8. The method of claim 1, further comprising:
transmitting the sensing report to the first management function; and
transmitting the positioning report to the second management function, wherein the second management function is configured to receive the sensing report from the first management function and is configured to identify the position of the object based on the positioning report and the sensing report.

9. A method to support a positioning operation and a sensing operation performed by a network, the method comprising:
establishing, between a first management function of the network and a second management function of the network, a joint positioning and sensing session;
transmitting a first configuration associated with a sensing operation;
transmitting a second configuration associated with a positioning operation;
receiving a sensing report that indicates a characteristic of an object within an environment, the characteristic determined based on the sensing operation;
receiving a positioning report; and
identifying a position of the object within the environment based on the positioning report and based on the characteristic indicated by the sensing report.

10. The method of claim 9, wherein:
the first management function includes a location management function (LMF); and
identifying the position of the object includes:
determining, by the first management function, the position of the object based on a positioning measurement indicated by the positioning report and based on a sensing measurement indicated by the sensing report, the sensing measurement is associated with:
a distance from a network entity to the object,
an angle measurement indicating an angle formed by a beam transmitted during the sensing operation and the object,
a velocity of the object, or
a combination thereof.

11. The method of claim 9, wherein establishing the joint positioning and sensing session includes performing, by the first management function, operations that include:
sending, to the second management function, capability information that indicates a capability of the first management function;
identifying one or more network entities, configurable by the second management function, to perform the sensing operation;
providing, to the second management function, a first indication of measurement types to be generated by the sensing operation; and
providing, to the second management function, a second indication of reference signal resources operable to perform positioning measurements.

12. The method of claim 9, wherein establishing the joint positioning and sensing session includes performing, by the second management function, operations that include:

sending, to the first management function, capability information that indicates a capability of the second management function;

identifying one or more network entities, configurable by the first management function, to perform the positioning operation;

providing, to the first management function, a first indication of reference signal resources operable to perform sensing measurements.

13. The method of claim 9, wherein:

transmitting the first configuration includes transmitting the first configuration to a first set of network entities, and transmitting the second configuration includes transmitting the second configuration to a second set of network entities.

14. The method of claim 13, wherein at least one network entity is included in the first set of network entities and in the second set of network entities.

15. The method of claim 13, wherein at least one of the first set of network entities includes a base station, and wherein at least one of the second set of network entities includes a transmission reception point (TRP).

16. The method of claim 13, wherein at least one of the first set of network entities includes a transmission reception point (TRP), and wherein at least one of the second set of network entities includes a user equipment (UE).

17. The method of claim 9, wherein the first management function includes a location management function (LMF), and wherein the second management functions includes a sensing management function (SnMF).

18. The method of claim 17, wherein receiving the positioning report includes receiving the positioning report at the first management function, and wherein receiving the sensing report includes receiving the sensing report at the second management function.

19. The method of claim 18, further comprising:

transmitting, by the second management function, the sensing report to the first management function.

20. The method of claim 17, wherein receiving the positioning report includes receiving the positioning report at the first management function, and wherein receiving the sensing report includes receiving the sensing report at the first management function.

21. The method of claim 20, further comprising:

transmitting, by the first management function, the sensing report to the second management function.

22. The method of claim 9, wherein:

transmitting the first configuration includes transmitting the first configuration to a base station;

transmitting the second configuration includes transmitting the second configuration to the base station, wherein the base station is configured to transmit the first configuration and the second configuration to a network entity served by the base station.

* * * * *